(12) United States Patent
Basu

(10) Patent No.: US 10,986,177 B2
(45) Date of Patent: Apr. 20, 2021

(54) SYSTEMS AND METHODS OF SELF-FORKING BLOCKCHAIN PROTOCOL

(71) Applicant: 0Chain, LLC, San Jose, CA (US)

(72) Inventor: Saswata Basu, San Jose, CA (US)

(73) Assignee: 0Chain, LLC, San Jose, CA (US)

( * ) Notice: Subject to any disclaimer, the term of this patent is extended or adjusted under 35 U.S.C. 154(b) by 219 days.

(21) Appl. No.: 16/027,248

(22) Filed: Jul. 3, 2018

(65) Prior Publication Data

US 2019/0123892 A1     Apr. 25, 2019

Related U.S. Application Data

(60) Provisional application No. 62/707,177, filed on Oct. 24, 2017.

(51) Int. Cl.

| H04L 29/08 | (2006.01) |
|---|---|
| G06Q 20/06 | (2012.01) |
| H04L 9/06 | (2006.01) |
| H04L 9/08 | (2006.01) |
| H04L 9/32 | (2006.01) |
| G06Q 20/22 | (2012.01) |
| H04L 29/06 | (2006.01) |

(52) U.S. Cl.
CPC ........ *H04L 67/1059* (2013.01); *G06Q 20/06* (2013.01); *G06Q 20/0658* (2013.01); *G06Q 20/223* (2013.01); *H04L 9/0637* (2013.01); *H04L 9/0643* (2013.01); *H04L 9/0841* (2013.01); *H04L 9/0894* (2013.01); *H04L 9/3236* (2013.01); *H04L 9/3297* (2013.01); *H04L 63/1466* (2013.01); *H04L 2209/38* (2013.01); *H04L 2209/56* (2013.01)

(58) Field of Classification Search
CPC . H04L 67/1059; H04L 9/0841; H04L 9/3236; H04L 9/3297; H04L 9/0643; H04L 9/0894; H04L 63/1466; H04L 9/0637; H04L 2209/56; H04L 2209/38; H04L 63/10; G06Q 20/06; G06Q 20/223; G06Q 20/0658
USPC ........................................................ 380/277
See application file for complete search history.

(56) References Cited

U.S. PATENT DOCUMENTS

| 9,875,510 B1 * | 1/2018 | Kasper | H04L 67/104 |
| 2018/0152289 A1 * | 5/2018 | Hunt | G06Q 20/223 |
| 2018/0276626 A1 * | 9/2018 | Laiben | G06Q 20/02 |
| 2019/0378069 A1 * | 12/2019 | Deshpande | G06Q 10/06315 |

OTHER PUBLICATIONS

Rob Glenn and Stephen T. Kent, The NULL encryption algorithm and its use with ipsec. RFC, 2410:1-6, 1998.

(Continued)

*Primary Examiner* — Kambiz Zand
*Assistant Examiner* — Aubrey H Wyszynski
(74) *Attorney, Agent, or Firm* — Levine's Tech Consulting, LLC; Frank E. Levine

(57) ABSTRACT

A multi-dimensional blockchain protocol designed to self-fork into multiple chains, scale infinitely, achieve zero cost transactions, sub-second finality and open new markets for sharders, blobbers, developers, and content publishers, while managing a low inflation rate.

26 Claims, 18 Drawing Sheets a self-forking chain dimension

(56) References Cited

OTHER PUBLICATIONS

Ralph C Merkle, A digital signature based on a conventional encryption function. In Advances in Cryptology—CRYPTO '87, A Conference on the Theory and Applications of Cryptographic Techniques, pp. 369-378. Springer, 1987.
Satoshi Nakamoto, Bitcoin: A peer-to-peer electronic cash system, 2009. URL: http://www.bitcoin.org/bitcoin.pdf.
Proof of replication. Technical report, Protocol Labs, Jul. 2017.
Filecoin: A decentralized storage network. Technical report, Protocol Labs, Aug. 2017.
David Vorick and Luck Champine, Sia: Simple decentralized storage. Technical report, Nebulous, Inc., Nov. 2014.
Shawn Wilkinson, Tome Boshevski, Josh Brandoff, James Prestwich, Gordon Hall, Patrick Gerbes, Philip Hutchins, and Chris Pollard, Storj: A peer to peer cloud storage network. Technical report, Storj Labs, Inc., Dec. 2016.

* cited by examiner n-Dimensional protocol scalability with chains, miners, sharders, blobbers, developers, publishers a self-forking chain dimension Miner dimension of the blockchain consisting of primary, secondary, and bench miners Sharding dimension of the blockchain consisting of primary, secondary, and bench sharders Blobber dimension of the blockchain consisting of primary, secondary, and bench blobbers shows the calls to different chains, shards, and blobs from a singular transaction shows that the blockchain is also a platform for code and content contributors

- Data Type (stateful, stateless, ...)
- Block Time (100ms, 1s, 3s, 15s, ...)
- Data Size (1MB, 2MB, 100kB, ...)
- Transaction time (100us, 100ms, 1s, based on stake, ...)
- Compute, Bandwidth, Memory, Storage allocation (free based on stake, ...)
- Finality (sub-second, second(s), minute(s), ...)
- Number of Block Producers (3, 21, 100, 2048, ...)
- Number of Secondaries (zero, one set, two sets, ...)
- Number on Bench (zero, one set, two sets, ...)

- Signatures (ECDSA, BLS, Lamport, ...)
- Anonymity (none, zk-SNARKs, zk-STARKs, RingCT, ...)
- Verification — Merkle, Miner signature, zk-STARK
- Shard size (10 GB, ...)
- Blob size (1 TB, ...)
- User or Application reserve tokens (1%, 10%, ...) for transaction for n cycles, with threshold at ($1k, $10k, ...) after which ($0.01, $0.001, ...) is charged per transaction or per GB storage
- Lock Deposit for Miners, Sharders, Blobbers ($10k, $100k, ...) for n (2, 3, 10, ...) cycles after inclusion in the set to prevent malicious activity
- Reward Token for Miners, Sharders, Blobbers (mean, median, min of ask price)

Forking parameters for the blockchain protocol

FIG. 11

View of IoT architecture on the blockchain

View of multiple applications on the blockchain

- Blobber/Sharder 1510
  - Sybil (pretend to store) — replace shard/blob periodically
  - Outsourced (commit to store more) — access randomly, punish high latency sharder/blobber
  - Generation (claim to store more) — lose money if storage fee is more than reward gained, which is divided among all sharders and blobbers

- Code (client) 1530
  - Infinite loop, calls, reads, writes — wall time terminates transaction
  - Beyond threshold user will pay fees
  - Freeze account
  - Concurrent writes not allowed

- Data (client) 1520
  - Infinitely large data set — Wall time prevents upload
  - Beyond threshold user will pay fees
  - Freeze account Various attack scenarios of the protocol

FIG. 15

SYSTEMS AND METHODS OF SELF-FORKING BLOCKCHAIN PROTOCOL

PRIORITY APPLICATIONS

For purposes of the USPTO extra-statutory requirements, the present application constitutes a utility application related to and claims the benefit of priority from U.S. Provisional Patent Application No. 62/707,177 filed on Oct. 24, 2017.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

FIELD OF THE INVENTION

The present invention is in the technical field of blockchain protocols. The present invention involves a self-forking blockchain protocol.

BACKGROUND

Internet is a global computer network providing a variety of information and communication facilities, consisting of interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

Conventional blockchain technology do not scale and have a high cost of consensus which makes it difficult to use with IoT devices and for micro-transactions. IoT devices typically send a lot of data and so, cumulative costs for such transactions would be too high for a business to be able to use such data. Additionally, daily high-frequency micro-transactions accumulate high fees over time relative to the total amount transacted.

Conventional blockchain technology such as Bitcoin and its derivatives are heavily oriented toward miner incentives to build consensus. These older technologies use work oriented schemes (Proof-of-work) which waste energy resources, and are becoming more centralized mining pools, because of expensive specialized computing power required to achieve consensus, which defeats the original purpose of decentralization. Bitcoin's altcoins are cheaper and more decentralized in comparison, but as they grow, they will suffer the same consequences.

A rather recent blockchain technology, Ethereum, have incorporated scripts or coded transactions which use computing, memory, storage, and bandwidth resources. While the flexibility of a code enables new applications, it complicates the mining process and puts a strain on the resources. This led to charging of fees to properly incentivize contract writers and miners to include a transaction in a mined block. Thus, during high demand events, such as an ICO (initial coin offering), where there is a strong demand to get in the first block mined, a lot of transactions do not go through because the network is overwhelmed and only those that pay a high fee gets their transactions recorded in a block.

Several prominent blockchains (Bitcoin, Ethereum) have gone through the forking process and this period is destabilizing because of uncertainties over the integrity of the forked chain, miner incentives, and user demand. Forks happen because of the need to change the code that cannot be done with a minor upgrade, and is necessary to meet certain application requirements that were not thought of in the initial design. An additional reason for a fork is to reverse a large malicious transaction that has taken place because of an implementation flaw (Ethereum).

Both Bitcoin and Ethereum have a very high inflation rate of mining which reduces over time. Bitcoin started out with 100% before it reduced to its current 4% rate. Ethereum's current inflation rate is 14% but is expected to change after a hard fork in future.

SUMMARY OF THE INVENTION

The present invention is systems and methods of a self-forking blockchain platform. A system and method of self-forking on a blockchain platform, comprising: selecting an initial set of miners from a list of miners for the fork; assigning an address to the fork to receive transactions.

The system and method of self-forking blockchain platform, wherein the default assigned address is the genesis chain address.

The system and method of self-forking blockchain platform, wherein the fork is for code chain, data chain, state chain or stateless chain.

The system and method of self-forking blockchain platform, further comprising: voting of all stakeholders from a genesis chain to allow a fork; selecting to fork based on a majority vote of the stakeholders.

The system and method of self-forking blockchain platform, further comprising: using one or more sharders on the fork to speed up access, reduce memory or reduce storage.

The system and method of self-forking blockchain platform, further comprising: using a blobber to store data from the transactions.

The system and method of self-forking blockchain platform, wherein the blockchain platform is not affected by attacks including one or more of the following: outsourcing, collusion, generation, or sybil attacks.

The system and method of self-forking blockchain platform, wherein one of the received transactions retrieves or records information on more than one fork.

The system and method of self-forking blockchain platform, further comprising: processing multiple transactions in parallel on one or more forks.

The system and method of self-forking blockchain platform, further comprising forking in response to one or more of the following parameters: data type, block time, data size, transaction time, compute, bandwidth, memory, storage allocation, finality, number of block producers, number of secondaries, number on bench, signatures, anonymity, verification, shard size, blob size, user or application reserve tokens, lock deposit, reward tokens.

A system and method of self-forking on a blockchain platform, comprising: co-existing of two or more chains on the blockchain platform after a fork; assigning a set of two or more miners to one or more chains; categorizing one or more assigned miners as primary, secondary or bench miner; tracking history of one or more chains independent of other chains; allowing a zero-cost fixed inflation model to reward the miners.

The system and method, further comprising: assigning a set of one or more sharders to one or more chains to speed up access, reduce memory or reduce storage; categorizing one or more assigned sharders as primary, secondary or bench sharder.

The system and method, further comprising: assigning a set of one or more blobbers to one or more chains to store data; categorizing one or more assigned blobbers as primary, secondary or bench blobber.

The system and method, further comprising: avoiding overloading a miner, sharder or blobber by separating one or more assignments; scaling the chains by separating the assignments of miners, sharders or blobbers.

BRIEF DESCRIPTION OF THE DRAWINGS

The embodiments of this invention are illustrated by way of example and not limitation in the figures of the accompanying drawings, in which like references indicate similar elements and in which:

FIG. 11 is a view of the fork parameters that would classify a new chain.

FIG. 15 shows various attack scenarios on a blockchain protocol.

DETAILED DESCRIPTION OF THE INVENTION

The systems and methods of a blockchain platform that allows self-forking. The forked blockchains allow N-dimensional chains and transactions in parallel. A blockchain can be forked when one or more forking parameters are met. The self-forking blockchain platform is robust and can withstand several types of attacks.

Figure 1:
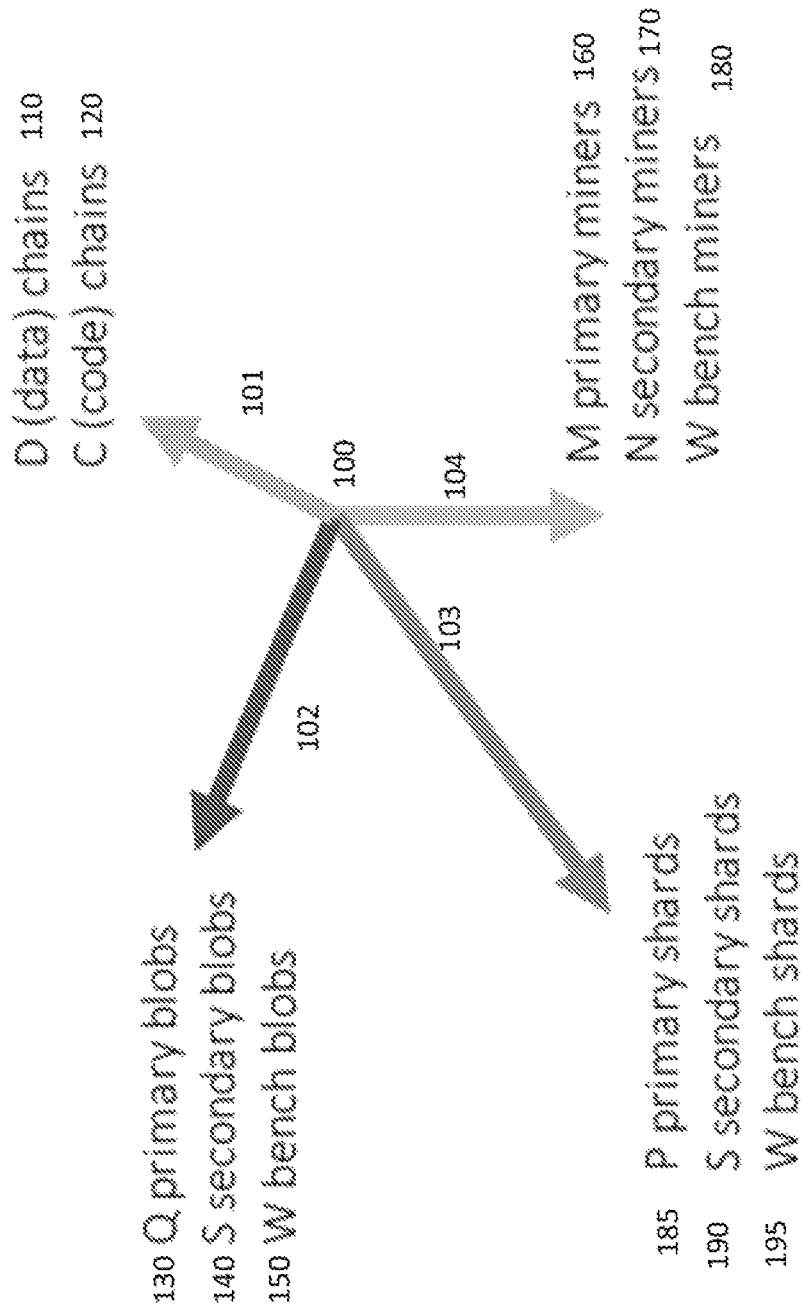
FIG. 1 is a topology of an n-dimensional blockchain protocol.

Referring now to the invention in more detail, in FIG. 1 there is shown a n-dimensional blockchain protocol 100 which has multiple chains 101 to 104 based on different forkable parameters with miners 160, 170 and 180, sharders 185, 190 and 195, blobbers 130, 140 and 150 as part of the blockchain scalable system. Today there are a lot of blockchains technology in the decentralized market, with different tweaks in their technology to achieve consensus for transactions. With multiple chains under one token currency, it enables multiple applications to be satisfied with a forkable parameter, without the need for a new blockchain. The miners, categorized as primary P 160, secondary S 170 and bench W 180, help efficient distribution of stakeholders and providing seamless availability when one or more miners are busy or offline. The sharders, categorized as primary P 185, secondary S 190 and bench W 195, help reduce compute, memory, storage, and bandwidth requirements and allow for faster indexing and access of data or code. The blobbers, categorized as primary Q 130, secondary S 140 and bench W 150, help reduce the cost of storing content for IoT applications. The blockchain could also be forked based on data type, categorized as data D 110 or Code C 120 chain. The purpose of having multiple blockchains is for a single protocol to be applicable for various applications, and to decouple the value of the underlying token used for mining, sharding, blobbing, coding, and publishing activities.

There are protocols today that have the concept of sidechains for better speed and scalability. In the case of Blockstream, the sidechains are pegged to the BitCoin network, and so the merged-mining can be used for verification of the blocks on the sidechains to prevent hash attacks on a new set of miners. In a similar vein, Plasma.io can enable micro-transactions on its chain and periodically use fraud proofs to peg the state back on the Ethereum network. These changes to the legacy Bitcoin and Ethereum may help scalability of simple micro-transactions but is too complex, unstructured, and expensive for an enterprise application that needs to scale deterministically at a low cost.

Figure 2:
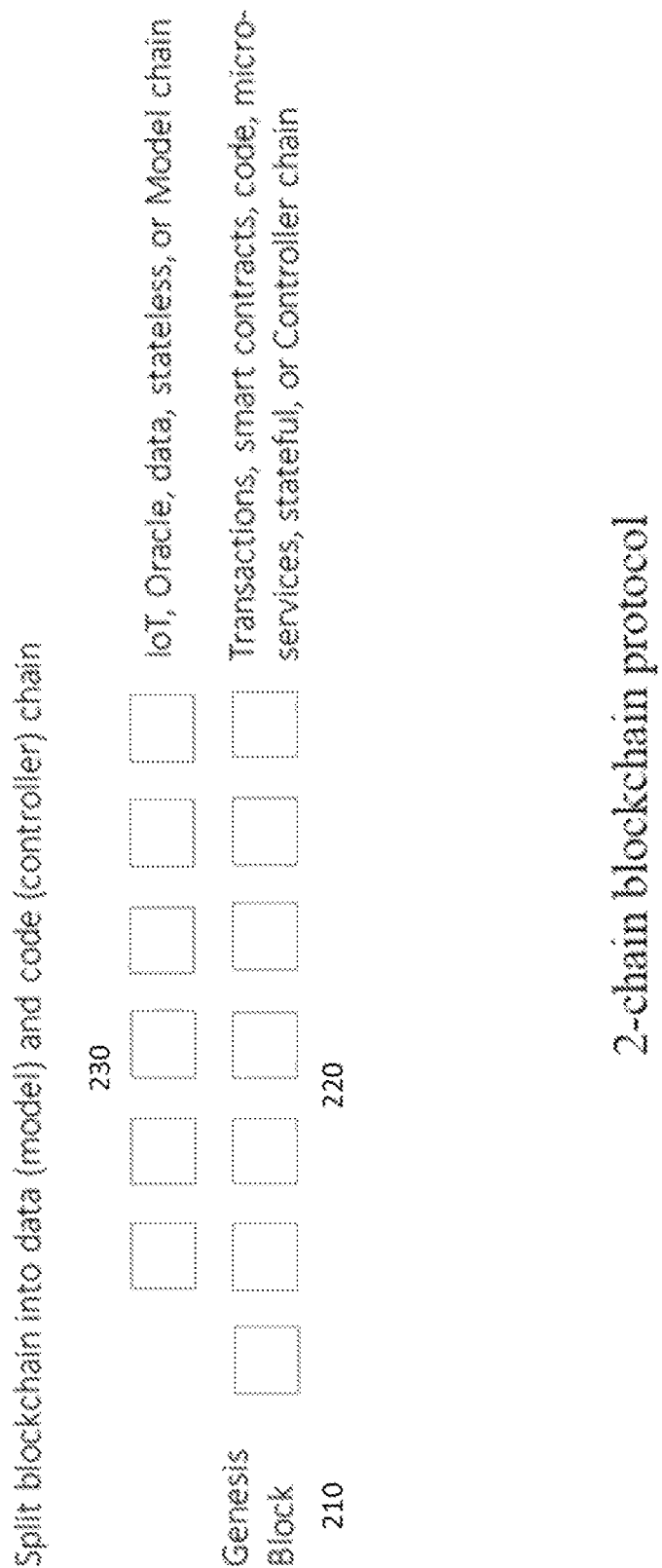
FIG. 2 shows a 2-chain architecture consisting of the data or stateless chain and a code or stateful chain.

Referring now to the invention in more detail, FIG. 2 depicts two blockchains because of a fork from the genesis block 210 on one of the blockchain. The purpose of having two chains 220 and 230 at the very onset of the network is to separate the transactions into "stateful" and "stateless" buckets to achieve better scalability. The separation is also easier for development as it would then conform to the MVC (Model-View-Controller) architecture that is used by most enterprise grade applications, where model is representation by data or the database, the controller is essentially methods or functions that work with data and change states, and the view is visualization of the data by the client. The data-code separation places different memory requirement for the miner's infrastructure. A stateful chain would need all the states to be in memory to facilitate changes to its states. A stateless chain can be placed in SSD or Disk depending on the frequency of access. There is hardly any memory requirement to process the transaction, as there is no need to know the previous states. As each of the chains grow and the need for sharding arises, then the infrastructure requirements are different.

An IoT data set, an Oracle, and published content are just examples of 'stateless' data that has no memory or coding requirement for such a transaction. The transactions can be processed much faster and be kept in SSD or disk after the block is mined. And so, a block time for such a chain can be set to a shorter time compared to a 'stateful' chain. The miner incentives for a data chain is expected to be less than the code chain because the infrastructure cost would be much less.

A micro-transaction, such as paying for coffee, or a bunch of micro-services, that convert raw IoT data to calibrated data, and to different datasets such as hourly and day data averages, are examples of 'stateful' code that needs states and code to be loaded in memory for faster execution. For a large enterprise application, which may have 100 s of microservice calls, it makes sense to have all of states and bytecode in memory to achieve a result faster than if it were constrained by disk I/O. One can conceivable use a larger block time for a code chain for applications that require larger processing time to generate an output.

Figure 3:
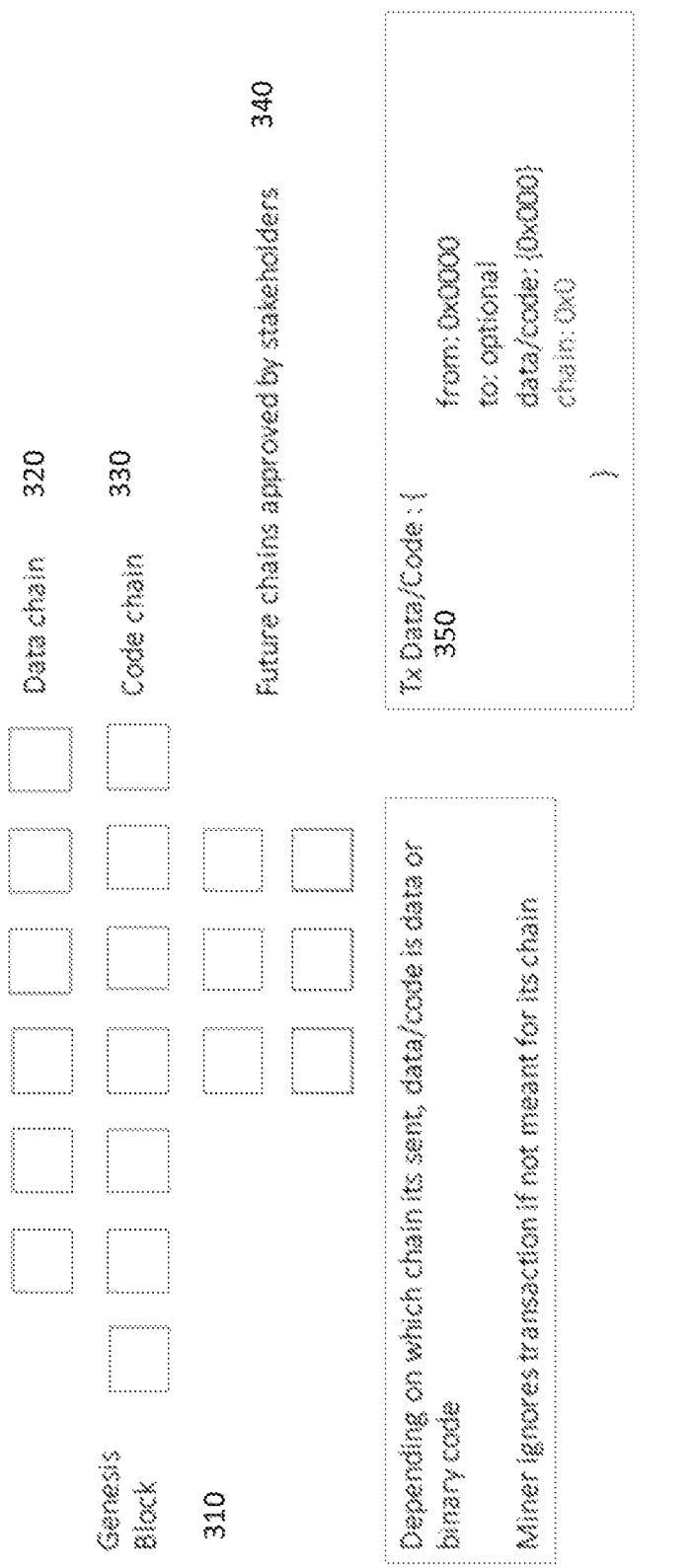
FIG. 3 shows a self-forking blockchain dimension.

FIG. 3 further depicts the self-forked chain dimension of the blockchain with a genesis block 310 with a data chain 320 and code chain 330 and future chains approved by stakeholders 340. The self-forking process would involve ⅔ majority of stakeholder votes to allow for a fork proposal. After such a fork, has been established, an initial set of miners are chosen for the future chain. For a transaction to be sent to this chain, an easy implementation would be to address the transaction to a specific chain address. Tx Data/Code 350 shows the parameters used to identify from address, optional to address, data type i.e. data or code and chain address. If there is no address, the transaction would default to the genesis chain (which is a code chain). Miners on each chain ignore transactions from their buffer queue that are not addressed to them. Depending on whether the data or code is sent to a code or data chain, the miner will treat it as such. So, a byte code sent to a data chain will be just a piece of data, while if sent to the code chain will execute such code.

Figure 4:
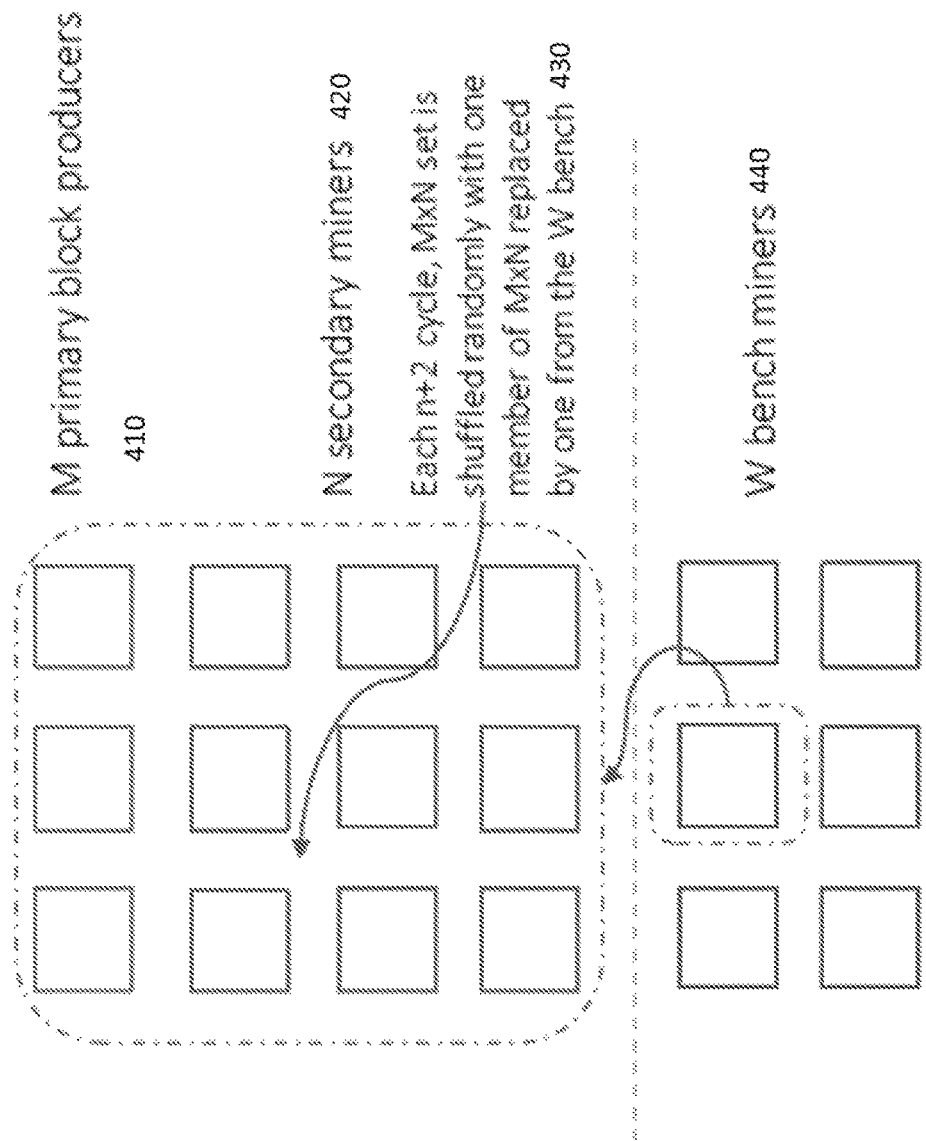
FIG. 4 shows the miner dimension of primary, secondary, and bench miners.

FIG. 4 shows the miner dimension of the blockchain in a typical DPoS (delegated proof-of-stake) configuration, where M miners 410 are delegated by stakeholders through a voting process. As is typical in a DPoS scheme, one miner produces a block while ⅔ miners verify the block. In our innovative scheme, we add an additional group of miners that back up the M set of primary miners and form a M×N set where M 410 are the designated primary miners decided based on a random selection, and N 420 are the secondary miners. The purpose of the backup miners is to prevent withholding and censorship by a primary miner. Additionally, if the primary miner is offline or has an unusually high latency, backup miners would be able to deliver the block to the network. Out of the N blocks generated during the block production slot, if ⅔ have the same block hash then that block is selected to be added to the chain. Typically, the N set would be a small set, otherwise it would become like a proof-of-work concept where all the miners are generating blocks and are not delegated to do so in their designated time slot.

If the set of M miners is kept small, then the clients can conduct a fast and easy validation of the last m blocks produced to determine if a transaction has been processed. SPV (simple payment validation) or light client validation or syncing with one of the miner node is done easily compared to proof-of-work or naïve proof-of-stake, where all the nodes are producing blocks and uncles and there is no way to verify that the node is malicious other than doing proper Merkle validation at the light client or syncing with the node. The way it is done now for Ethereum is to download the block headers and use a distributed hash table for trie nodes to verify a transaction, account balance, validate a block, or monitor an event. In a M×N set, only few miners exist and so by connecting to M miners, one can sync up much faster by just comparing the block hashes of all the miners of the last few blocks. A block hash is a hash of all the transactions in a block. If one suspects Sybil attacks, they just need to verify the signatures of the mined blocks, or one can compare the block hashes of the latest blocks from the M miners and determine if they are consistent. With a M×N miner set, large number of uncles and Sybil attacks are essentially eliminated, and have a much faster sync to the network.

The shuffling scheme of the M×N set is critical as it determines the proper decentralization process, otherwise attackers can hone in on one miner or be that miner that generates the random seed. The process of generating a random seed is to have each M×N miner generate a hash of a random number in one cycle and post it on the data chain, and have the last miner hash these hashed numbers together to generate a random seed, which would be an input to a deterministic mapping function that generates the next M×N set, such that one member of the M×N set is dropped in favor of another from the W 440 bench set, for example, as shown at 430. In the next cycle, the mapping is validated by other miners, and all the miners reveal their random number and post it on the data chain. So, the whole process of generating a shuffled M×N set with a new member from the bench is recorded and can be verified by anyone. In the third cycle, the new M×N set takes effect and is involved in mining the blocks, and the whole process of shuffling the miners is repeated.

Let us consider some malicious attack scenarios. Selfish Mining—if a miner wants to stay on the M×N set for selfish mining, the miner needs to be either lucky or collude with all the miners since it is impossible to have the same hash if one miner does not collaborate. So this prevents the miner from selecting itself in the primary spot or from exiting the M×N set.

Bad Transaction (Double Spend)—for this to happen, the miner needs to be lucky to collude with ⅔ other M×N miners, otherwise it needs all miners in the M×N set to collude to be malicious on a consistent basis. This is better than Bitcoin's as there you need to control 51% of hashing power to collude. Of course, with current economics Bitcoin would need more investment than SustainX, but in due time, the cost would be higher for our network.

Each M block producer is focused on producing a block, and include as many transactions as it can within a specific wall time, or until all the transactions in the queue are exhausted. The hashes of all the transactions are then combined to produce a Block Hash, which is then compared with the secondary block producers. If the Block Hashes match, then the block is considered an almost valid block, and hence only one block time is required for finality in such case. If the primary and secondary miners have non-matching Block Hashes, then the primary miner's block is chosen to be added to the chain and later validated by the other miners in the M set. It is assumed that the algorithm will be such that the same number of transactions will be selected by the primary and secondary miners, as long as they both have similar types of computing resources. It's important that the stakeholders stipulate to the miners to have a similar computing environment to benefit the protocol and themselves.

When a primary miner is engaged in producing a block, the other miners are busy validating the previous blocks. The miners in the M×N set get rewarded every production cycle, and their rewards are set periodically by the stakeholders. The rewards are based on miner's ask price and the stakeholders default selection would be a median price for the miner. A miner needs to meet the minimum computing requirement to be a part of the mining pool. A miner needs to reserve a percentage of their total earning potential over the course of a period (for example, one year or month). A miner's reserve is "locked" before, during, and after the mining cycle for n cycles, before they are released. When the reserve is locked, a miner cannot make a withdrawal from that portion of their fund.

In one embodiment, FIG. 4 shows multiple generators, i.e. miners in time slot 1, validators, i.e. sharders in time slot 2 followed with deterministic consensus in the 3rd time slot that could be applied to blobbers to store the data. Each time slot uses primary, secondary or bench categories having positional weights and improve efficiency. Each fork is tracked separately with multiple histories independent of each other. This results in a zero-cost fixed inflation model to pay the miners, and a scalable model for the cloud by dividing the miners into "miners, sharders, and blobbers." The separation of roles and assigning different sets of miners, sharders and blobbers allows multiple miners generating blocks and multiple sharders verifying the blocks in the subsequent time slot, and multiple blobbers finalizing the blocks with transactions that are saved by blobbers in the 3rd time slot. In one embodiment, a miner may also act as a sharder and a blobber. For example, a miner for time slot 1 chain 1 could also act as a sharder or blobber for the same or other chains.

Figure 5:
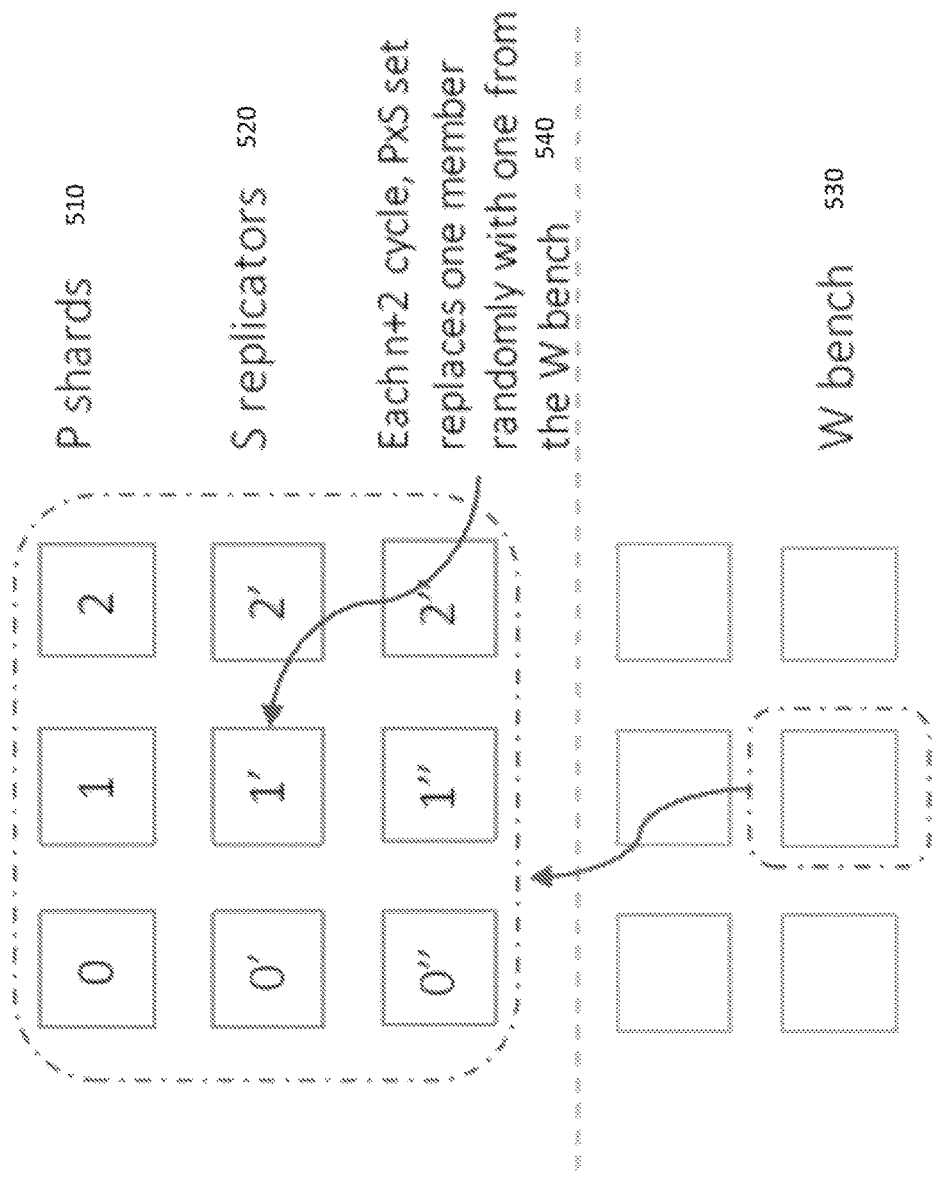
FIG. 5 shows the shard dimension of primary, secondary, and bench sharders.

In more detail, referring to the invention of FIG. 5, as the chain gets substantially bigger, the miners will need to add memory or storage or both depending on the chain they are working on. To speed up data access and reduce memory and/or storage requirements, the chain is sharded after it reaches a certain size. Thus, there will be multiple shards, categorized as primary P shards 510, secondary replicators S 520, and W bench shards 530 and with a good indexing scheme, access for data or code would be much faster. The shuffling of shards uses the same mechanism as described earlier for miners at 540. The shards are either kept in memory if it is storing the code chain, or in SSD or Disk if it is storing the data chain. The shards will have replications of it so that if the primary shard is offline, then the secondary (replicated) ones can provide the relevant data or code. Sharders hold and index the data and code shards. Miners communicate with Sharders to complete transactions. Sharders are expected to have enough processing, bandwidth, and memory to spawn multiple processes depending on demand of a data/code. In an enterprise application, it is conceivable that multiple calls are placed from the code chain to an older sharded code chain for older smart contracts, which gets executed at those shards and the results sent back to the current code, and is then published in the current data chain. So, the job and infrastructure requirement of a miner is separate from a sharder. Sharders does not need much computing power except for the code sharders, where they need ample computing and memory power to be able to execute smart contracts. The message passing between the miner and the relevant shard(s) is through a secured API call. The expectation is that sharders will have good connectivity to the network to minimize latency. As the chain gets substantially bigger, the miners will need to add memory or storage or both depending on the chain they are working on. To speed up data access and reduce memory and/or storage requirements, the chain is sharded after it reaches a certain size. See FIG. 5. Thus, there will be multiple shards and with a good indexing scheme, access for data and code would be much faster. The shards are either kept in memory if it is storing the code chain, or in SSD and Disk if it is storing the data chain. The shards will have a replica set so that if the primary shard is offline or fails or is a fraud entity, then the secondary (replicated) ones can provide the relevant data or code. Miners communicate with Sharders to complete transactions. Sharders are expected to have similar processing, bandwidth, and memory to keep processes balanced and maintain a synchronous operation most of the time.

In an enterprise application, it is conceivable that multiple calls are placed from the code chain to an older sharded code chain for older smart contracts, which gets executed at those shards or a single shard spawning multiple processes, and the results sent back to the current code, and is subsequently published in the current data chain. So, the infrastructure requirement of a miner is a bit different from a sharder. Sharders does not need as much computing power, even in the case of code sharders, since they are not doing a lot of hashing or verification activities. The method calls between the miner and the relevant shard(s) is through a secured API call. The expectation is that sharders will have good connectivity on the network to minimize latency. The sharders, like miners, collect fees after each n cycles. The stakeholders periodically determine the fee, and by default, a median ask value is chosen.

Let us consider attack scenarios. A sharder can cheat in several ways. It can pretend (Sybil attack) that it is sharding but hold no data or code, and hope that it does not get caught by a miner's call during the period it is serving as a sharder. A sharder can outsource its sharding activity in the sense that if a miner calls a particular block, it just relays the call to another shard. To prevent these two attacks, we force the miner to randomly choose a sharder for old contract calls. This randomness can be deduced from a different mapping function, but the input is derived earlier from the same random seed.

Now there is a possibility where a miner is colluding with a sharder, or could be the same entity (Sybil). In this case, the miner would not call that particular sharder, but then the other miners would have to collude as well for this sharder to hide, which is a remote possibility.

One last attack scenario is when all the replica is a Sybil version of the Sharder for a particular allocation. In this case, there is no way to verify that the replica is genuine. To this end, we propose that a sharder is replaced from its set every n+2 cycles with one from the bench. This ensures that any Sybil entries would be short-lived, and the integrity of the network would be restored, if violated. The sync of the new member takes some time depending on the size of the shard, and after the sync takes place, the new set is created, and the entire replacing process is restarted.

To prevent any long range attacks, we also do a Shard Hash for every shard, so that if an attacker goes back in time and changes a block, it would be reflected at the Shard header.

Figure 6:
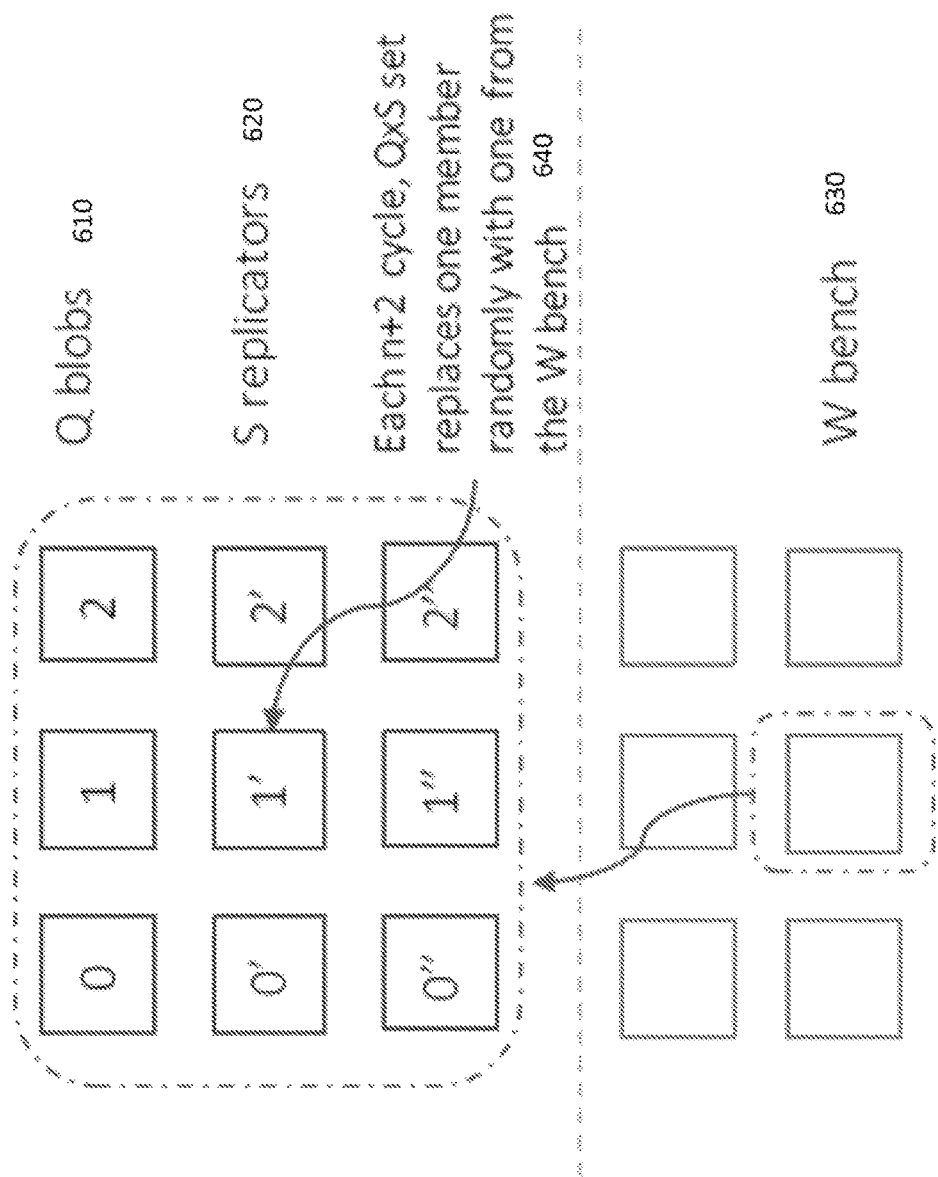
FIG. 6 shows the blob dimension of primary, secondary, and bench blobbers.

FIG. 6 shows the blob dimension of the blockchain designed to provide storage capacity to data that cannot fit into the transaction data limit size. Blobs, categorized as Q 610, replicators S 620 and W bench 630, are defined as storage entities that can store large, unstructured data (image, audio, video) and can be based on IPFS protocol for easier retrieval by Retrieval markets as proposed in File-Coin. Unlike FileCoin, we do not cater to Retrieval markets. The blobbers on our network earn a collective token based on amount of data added per n cycles. There are Q×S blobbers and all blobbers get rewarded equally as data flows in and is based on the size of data in n cycles. Data is distributed evenly among Q 610 blobbers. The blobbers are shuffled as described earlier for miners at 640. If data is uploaded via the data or code chain and it exceeds a certain size, it is sent to the blob assuming the user has enough reserve token for such data to stay persistent, otherwise the transaction would be invalid. User may indicate to the network via a transaction that it wants to prune some files to reduce its locked token commitment. Then the blobber holding the files would then mark those files for deletion. For each user or application, after a certain data Threshold, a percentage of the locked tokens will be sent to the Vault-Chain as a fee for storage. For each request for a blob, the requestor needs to have enough tokens in their account.

As new storage providers are accepted by stakeholders, they are first benched and later added to the list of Q×S blobber set as storage demand grows. Blob rewards are periodically set by stakeholders based on the median ask rate of the blobbers. Blobs are impossible to change or fake because it would otherwise result in a new hash which will not match with the content hash on the data chain.

Unlike FileCoin there is no bid and ask process of selecting storage providers, other than initially for the network. As with Filecoin, which need proofs to prevent Sybil (pretend to store data), outsourcing (commit to store more data) and generation (claim to store more data) attacks, we need to consider these attacks as well.

The generation attack is a net loss for the attacker because the attacker needs to pay fee to store data and the additional reward is divided up among other blobbers. Of course, it is possible for all blabbers to collude and start generating for the well-being of the blubber community. This can be prevented by making the storage fee> reward fee for high volume users. The outsourcing attack is prevented by an algorithm where the miner randomly calls a replica of a blob allocation. The Sybil attack is prevented by an algorithm where one of the blob in the Q×S set is replaced by one from the bench. The sync time may take a little longer than for the shard as the storage is expected to be much larger by at least 2 orders of magnitude. However, this creation and deletion process would prevent a fake replica from existing on the network. We could have used FileCoin's PoRep but that may lead to computing issues, which may be burdensome for storage providers, while in our case, if there is a good network connection and the blob sizes kept reasonably small, then the sync process will not take that much time.

The network pays the blobbers a reward based on the storage used. However, it is important to note that there is no reward for retrieval, but if a blobber has a high latency or if there is no data, then they will be punished during the retrieval process. Since a blobber get their token rewards after n cycles of service, they are held accountable to any problems during the retrieval process, whether that is due to bad bandwidth or any malicious activity.

Figure 7:
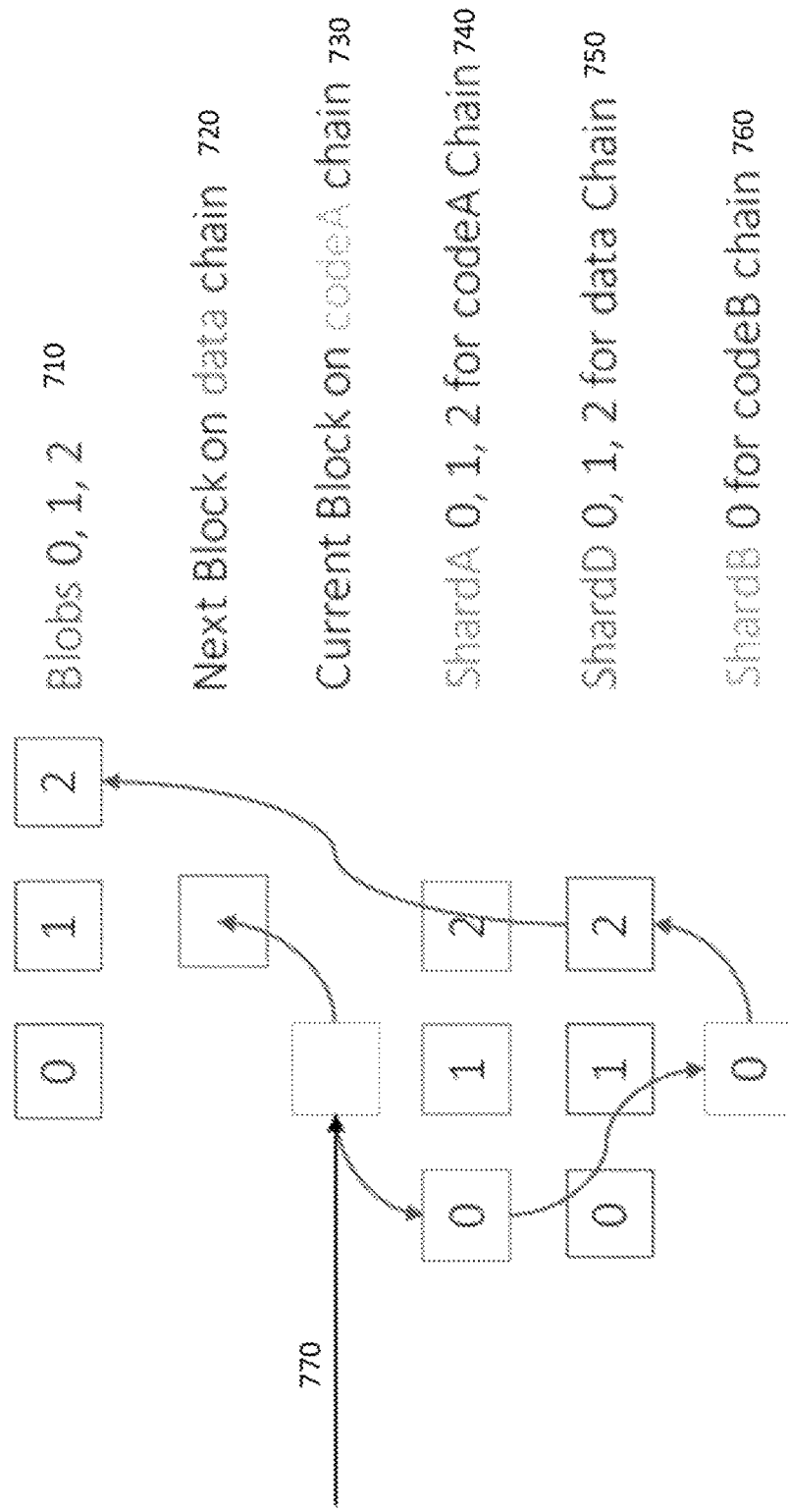
FIG. 7 shows the calls to different chains, shards, and blobs from a singular transaction.

FIG. 7 shows how a call 770 is made from a contract (e.g. parse file X and put a piece of data on the data chain) in codeA chain 730. This contract calls another contract (e.g. get file X) in codeB chain 760, which retrieves an IPFS hash from Shard 2 of the data chain 750, and then retrieves the actual file (file X) from Blob 2 710. Finally, the codeA 730 contract works on the file (parses and gets a piece of data 740) and records it on the data chain (mined on the next block 720).

Figure 8:
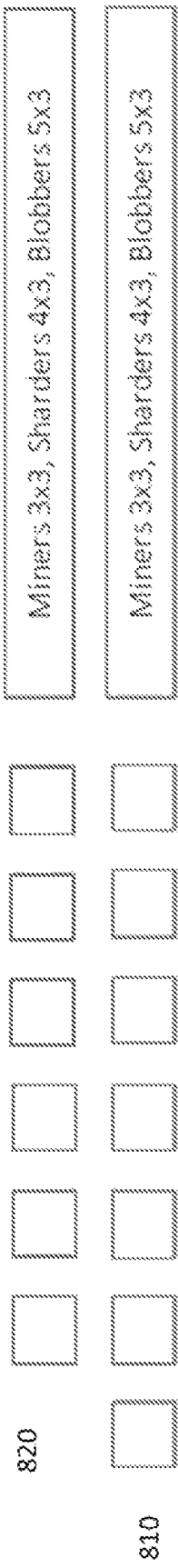
FIG. 8 shows logical separation of miners, sharders, and blobbers for different chains.

FIG. 8 shows that a logically different set of miners, sharders, blobbers, replicators exist for different chains. The same physical miner can have different mining nodes for different chains 810 and 820. So, if a miner, sharder, and blobber have a good reputation on one chain, then they will have a good chance of being included on a different chain.

Figure 9:
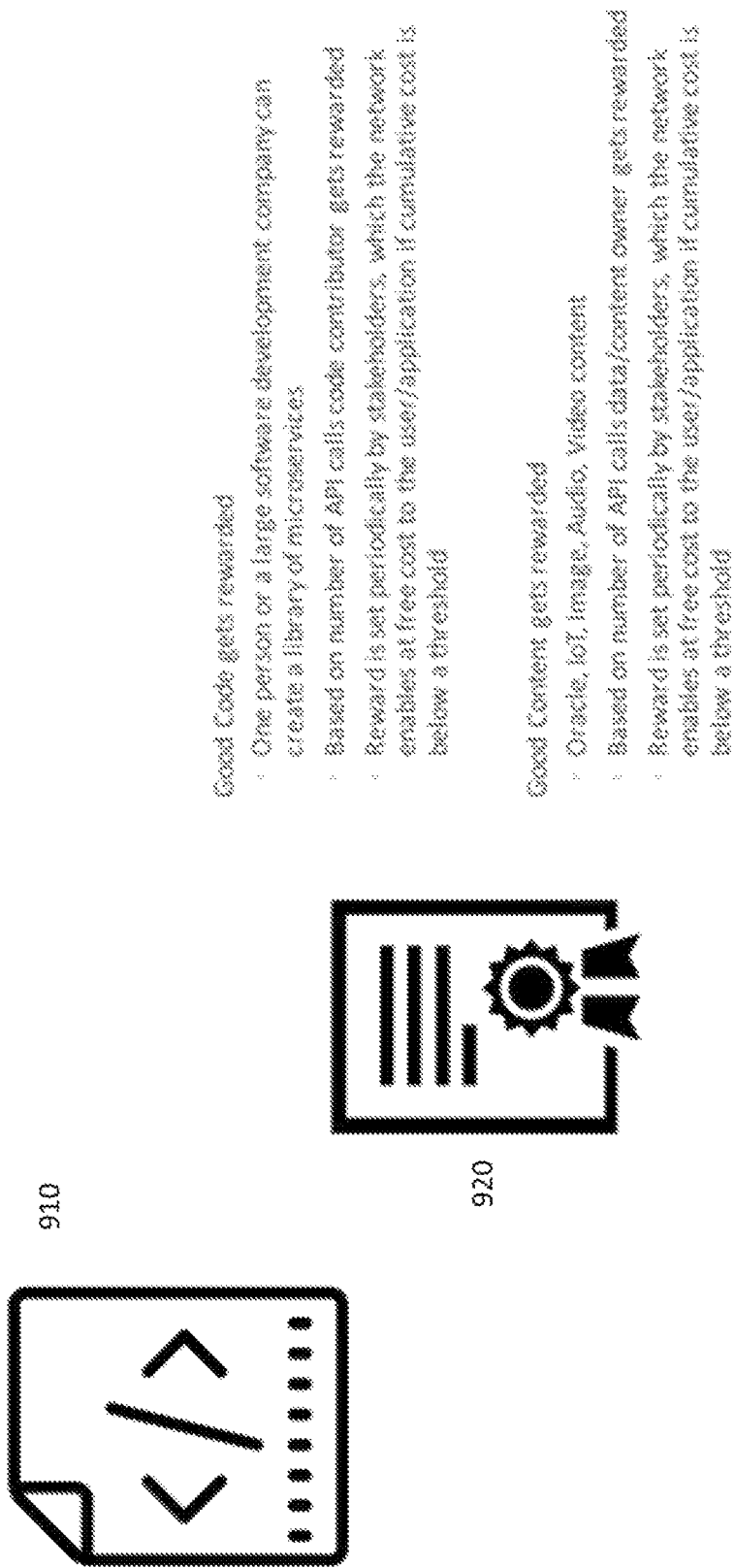
FIG. 9 shows a platform code and content contributors.

FIG. 9 shows that the blockchain provides a platform for Content 920 and Code 910 Contributors. As more code gets uploaded on the code chain, it would be mutually beneficial for users of the code as well as the developers. A good code that acts as a great utility library would get rewarded based on its usefulness. To be able to use such code, a user needs to have enough reserve token in their account, and depending on the frequency of usage, will need to send some tokens to the Vault as fees of using the network code. The amount of reserve needed for the code is based on the coder ask price. In general, the stakeholders will allow the ask price to be set by default, unless it is above the maximum limit set by the stakeholders. But if a coder asks a high price then less people will use as they need to hold a high reserve for n cycles before and after the transaction, and pay for such use if the frequency increase above a certain limit. Additionally, a coder needs to allow usage of its code at least n times by a user before they get rewarded, where n is set by the stakeholders based on the coder's preference. And so, one coder or a large software development company can create a library of micro-services that is used on a regular basis by several users and applications on the blockchain. For example, a well-tested ICO code and a code that parses Oracle data feed into specific JSON data format are sorely desired codes in the blockchain developer community. Based on number of API calls and the reserve token requirement set by the code contributor, developers would get rewarded tokens set based on the asking price of the coder.

In a similar way to good code, good content gets rewarded. For example, use of Oracle data, or IoT data, or an image, audio, or video content are examples where the content owner can get rewards and provide benefits to the user. Again, based on the number of API calls data/content owner gets rewarded, and the reward and reserve amount for the content is set periodically by stakeholders based on the content owner ask price. And like code, content is free for n times of usage by a user or application.

Figure 10:
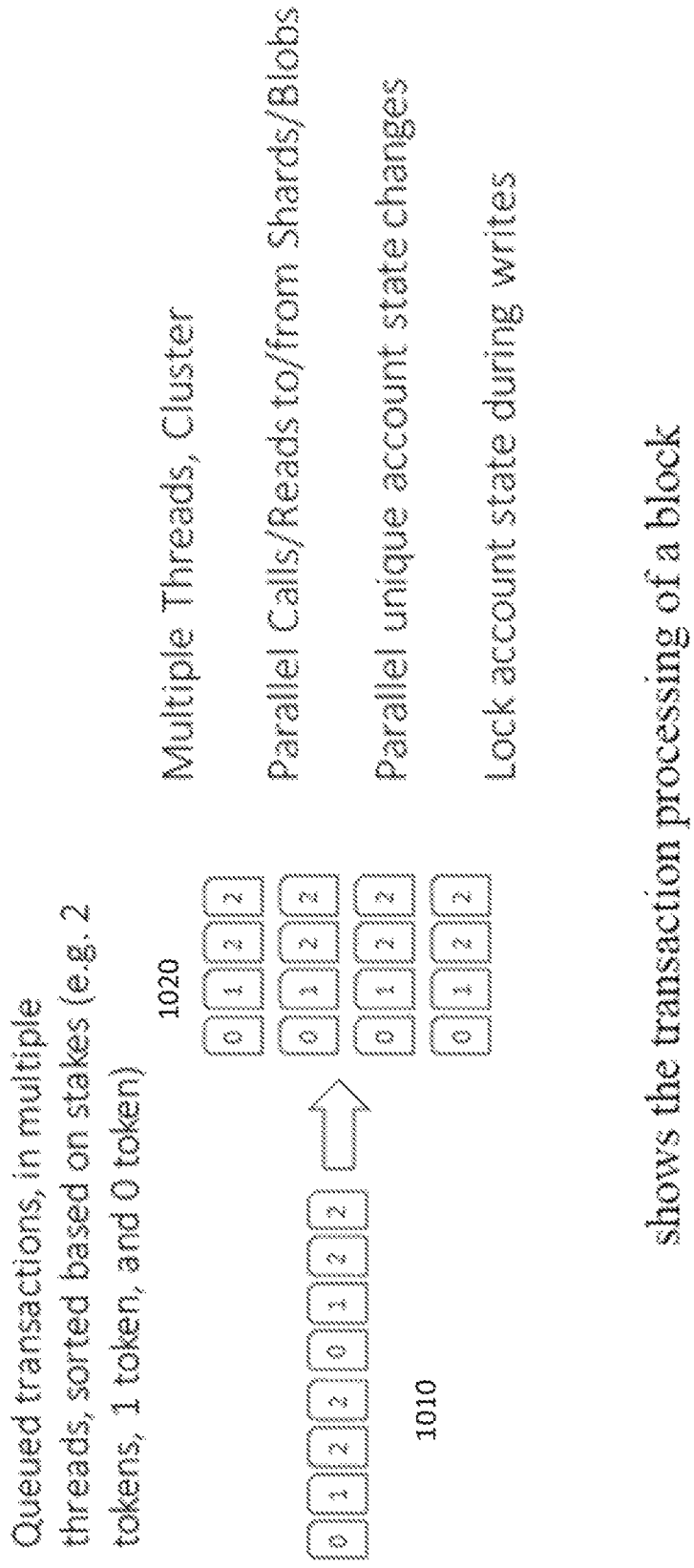
FIG. 10 shows the transaction processing of a block.

FIG. 10 shows that the transaction processing of a block. The transactions 1010 are queued in multiple threads 1020, sorted based on priority of their stakes before they are placed in the block. The multiple threads can be processed in one server or a cluster of servers. Each transaction is processed serially within a thread, although since there are multiple threads, there are multiple parallel transactions. However, states can only be changed by the same transaction and not by multiple transactions in multiple threads simultaneously. And so, to be specific, within a block, there can be multiple transactions with parallel reads and calls that do not change states and will be successfully included in the block, but there can be only one write or a state change for a transaction. So, if a state is locked by one transaction during the block processing time, then all other transactions that try to change that state will need to wait their turn or automatically fail if it goes over its allocated time and won't be included in the block. This architectural implementation makes sure that all code will be thread-safe regardless of the number of parallel transactions. If a malicious transaction calls itself recursively and try to change state, then it will fail. If the transaction changes multiple states, such as paying several entities, that is acceptable if those entities are not locked by another transaction. A malicious transaction can also try to call several contracts to waste a lot of computing power, memory, and bandwidth; but by doing so, it needs to reserve tokens and its intent would be hampered by the wall time, which cancels the transaction after allocated time has elapsed. User bandwidth, compute, memory, and frequency of transaction are all based on individual's stake. For storage, they need to lock their tokens. For transactions, they need to have enough tokens for n cycles before and after the transactions to guarantee bandwidth, compute, memory to place a transaction. However, if a user or application crosses a threshold of resource usage set by the stakeholders over a period, then the user or application gets charged for such and the fee is collected by the Vault.

Having very few tokens in the account does not mean a transaction won't go through, but it will be sent at a much lower priority, and will take time. If there are 100,000 users, and the block has transactions from 100 users, and each of them have similar stakes, then the bandwidth, compute, memory, and storage size per user is $1/100$ percentage of the node's capacity. In the case of IoT devices or Oracles, the application is responsible for holding tokens to guarantee availability of the required bandwidth, compute, memory, and storage size per device, and depending on the threshold, would need to send a fee to the Vault periodically.

FIG. 11 shows the different types of parameters that can lead to a forked chain. The code and data chains are examples of a stateless and a stateful chain. Today multiple chains coexist with different set of rules, but there isn't a protocol that allow for multiple chains to co-exist on the same underlying network topology, and multiple tokenized application may choose to use multiple chains as they fit.

As indicated in FIG. 11, block time is another parameter that has forked many chains in the past, where the need for several transactions is balanced against the time to finalize a transaction. With a shorter block time, transactions within a block can get finalized faster. But with a shorter block, there will less number of transactions in the block and a higher overhead for the block. Additionally, if a code chain has a short block time, and if a code takes a longer time to execute then it can never be included in the block unless it is modified. However, in the case of micro-payments, the transaction finality is important. For example, one should not have to wait for an hour to have their payment for a cup of coffee to be finalized, which typically should be within a second to be practically viable.

Referring to FIG. 11, the fee for compute, bandwidth, and memory usage for a transaction is typically what miners charge to prioritize a transaction over others in BitCoin and Ethereum. While this works for high value payment transactions, IoT and enterprise applications need to have very little fees or no fees imposed on their computation, memory or bandwidth usage, unless it exceeds a certain threshold. Additionally, if an IoT or Oracle application then executes on the data and produces several data sets then there needs to be a place to store the data. There are several decentralized storage services offered by Storj, MaidSafe, Siacoin, and Filecoin.

They are based on order matching bidders and sellers, but need recurrent proofs and transactions to be able to create a viable marketplace. However, because of the extra layer of complexity, computing, and bandwidth required to generate this market, it would be difficult to keep the cost down. Additionally, individual storage on home computers cannot effectively compete with enterprise data centers with respect to scale, cost, and reliability. So, these services may work for users seeking "decentralization" and willing to pay more. Since IoT and other Enterprise applications need an enterprise level storage but at a low cost, the network would bear that cost for all applications up to certain threshold, when they are expected to contribute to a portion of the rewards given out in the form of fees sent to the Vault. The network pays the blobbers, or storage providers, a reward based on the storage used and the frequency of data access. Users or applications storing the data permanently need to reserve some tokens permanently. Users or applications accessing the data need to reserve some tokens for n cycles before and after the transaction to move them. It is important to note that the storage built-in to the network is for use within the decentralized network, primarily for other decentralized applications. An example of this scenario is analytics and AI applications that use the data stored in the blob. Another example is a parsing application that parse Oracle data in different formats. However, for streaming applications the content is expected to be delivered by a CDN (content delivery network) or a social media application, and they would typically download a copy of the data and serve it to the masses. These applications are expected to have a scheme to monetize such activity for the user and the application. Even if the content is not delivered by the CDN, the IPFS protocol enables a peer-to-peer sharing which would reduce any spike in bandwidth demand for a popular content.

Again, referring to FIG. 11, the number of block producers determine the level of decentralization, and how fast the finality can take place. The minimum set of block producers need to be at least 3 for a $2/3$ majority to validated a transaction. So, if one block producer mines a block, that block needs to be verified by the other 2 block producers, before a transaction is deemed finalized. The less number of verification enables less number of redundant computations required for verification and would serve to reduce energy and financial cost. As the number of block producers increases, the security and decentralization of the transaction increases, if the nodes are not pooled by the same mining entity. For Bitcoin and Ethereum, most of the nodes are owned by 3 mining pools, and can in theory control the transaction on their network.

Based on the number of block producers, block time, and scheme the transaction finality can be designed to be long or very short. In a typical Delegated-Proof-of-Stake, there is one block producer and the produced block is verified by $2/3$ miners for it to be validated and added to the chain. If the number of block producers are small, say 3, the minimum for a proper decentralized system, then the finality is based on the block time of generating 3 blocks. Another way to reduce the finality is to add secondary miners. They serve the purpose of a quick validation and security over network loss or censorship. If you have at least 2 secondary set of miners, then for every primary block producer you have 2 secondaries that are producing the blocks in the same time slot. If $2/3$ blocks have the same block hash, then that block is finalized for all practical purposes and is advanced on the chain, and further verified by the other 2 primary miners. If the blocks are dissimilar, then the primary one is added to the chain. In most cases, the block hash will be same and the finality would then be the size of the block time. The secondary miners also protect transactions that suffer from data withholding, censorship, or if the node is offline. In the latter case, if the primary does not produce a block because it is offline, one of the secondary miner's block will be advanced to the network. The primary miner may also decide to withhold or a censor transaction from a block. If the secondary miners avoid such activity, and produce equivalent block hashes that contradict the primary, then their block will be advanced instead, and the primary will be put on notice and they would forfeit their reserve. The number of secondary miners is an important parameter, as it speeds up finality and increases the chance of data availability.

Referring to FIG. 11, there are several miners idle on the bench, and become active when called up to be part of the primary x secondary set, be it miners, sharders, and blobbers.

Other forking parameters include signatures, anonymity, verification, reserves, and rewards. Elliptic curve signatures are faster to encrypt messages compared to traditional RSA, and there are other signatures in development in the crypto community to consider depending on whether one desires more security such as Lamport or faster execution such as BLS.

Anonymity is another parameter in FIG. 11 to consider to fork a chain. The anonymity of an user can be done through ring signatures, but to prove the validity of a computation, one needs to provide a verifiable proof of the transaction so that the network can verify it through such proof. Such is the intent of the zk-SNARK algorithm, but it has one issue, and that it needs a trusted setup, zk-STARK is an evolution of the SNARK algorithm and it does away the need for a master key.

Verification is another parameter in FIG. 11 that will change in the future. Today, every transaction is verified by replaying the transaction or looking at the block hash. Replaying the transaction should happen to provide a decentralized verification process, but this means a set of redundant operations wasting money and energy. For a 3×3 miner set, there will be 5 redundant operations to verify if the transaction is valid. If this validation is not a replay of the full transaction operation but a shorter verification enabled by zk-STARK like algorithm, then it will cut down on the energy and cost of the network.

Other parameters that may necessitate a new chain are based on sharding and blob sizes, and the miner reserve token amount. The reserve tokens necessary to make sure that miners do not engage in malicious activity may differ from one application to another. A simple IoT application may not need for a big reserve, but an exchange or bank operation miners may need to put up a bigger reserve and have a larger number of cycles to hold the reserve for every mined block.

The reserve token parameter for the user or application reserve tokens and the number of cycles its held are decided based on how much is needed to execute a transaction by using the network's compute power, bandwidth, memory, storage, code, and content. This may depend on the user and application in consideration that use the chain(s) and the amount of resources consumed. If it exceeds a certain threshold, then the user or application would need to pay fees to the Vault on an ongoing basis.

The reward token for the Miners, Sharders, Blobbers, Developers, and Publishers determine the amount of inflation incurred by the network. The reward amount is decided based on the token value, the amount of reward activity, and the asking rate.

The initial parameters chosen for the chains are:
Data Type (stateful, stateless, . . . )
Block Time (100 ms, 1 s, 3 s, 15 s, . . . )
Data Size (1 MB, 2 MB, 100 kB, . . . )
Transaction time (100 us, 100 ms, 1 s, based on stake, . . . )
Compute, Bandwidth, Memory, Storage allocation (free based on stake, . . . )
Finality (sub-second, second(s), minute(s), . . . )
Number of Block Producers (3, 21, 100, 2048, . . . )
Number of Secondaries (zero, one set, two sets, . . . )
Number on Bench (zero, one set, two sets, . . . )
Signatures (ECDSA, BLS, Lamport, . . . )
Anonymity (none, zk-SNARKs, zk-STARKs, RingCT, . . . )
Verification—Merkle, Miner signature, zk-STARK Shard size (10 GB, . . . )
Blob size (1 TB, . . . )
User or Application reserve tokens (1%, 10%, . . . ) for transaction for n cycles, with threshold at ($1 k, $100, . . . ) after which ($0.01,$0.001, . . . ) is charged per transaction or per GB storage
Lock Deposit for Miners, Sharders, Blobbers ($10 k, $100 k, . . . ) for n (2, 3, 10, . . . ) cycles after inclusion in the set to prevent malicious activity
Reward Token for Miners, Sharders, Blobbers (mean, median, min of ask price)

Figure 12:
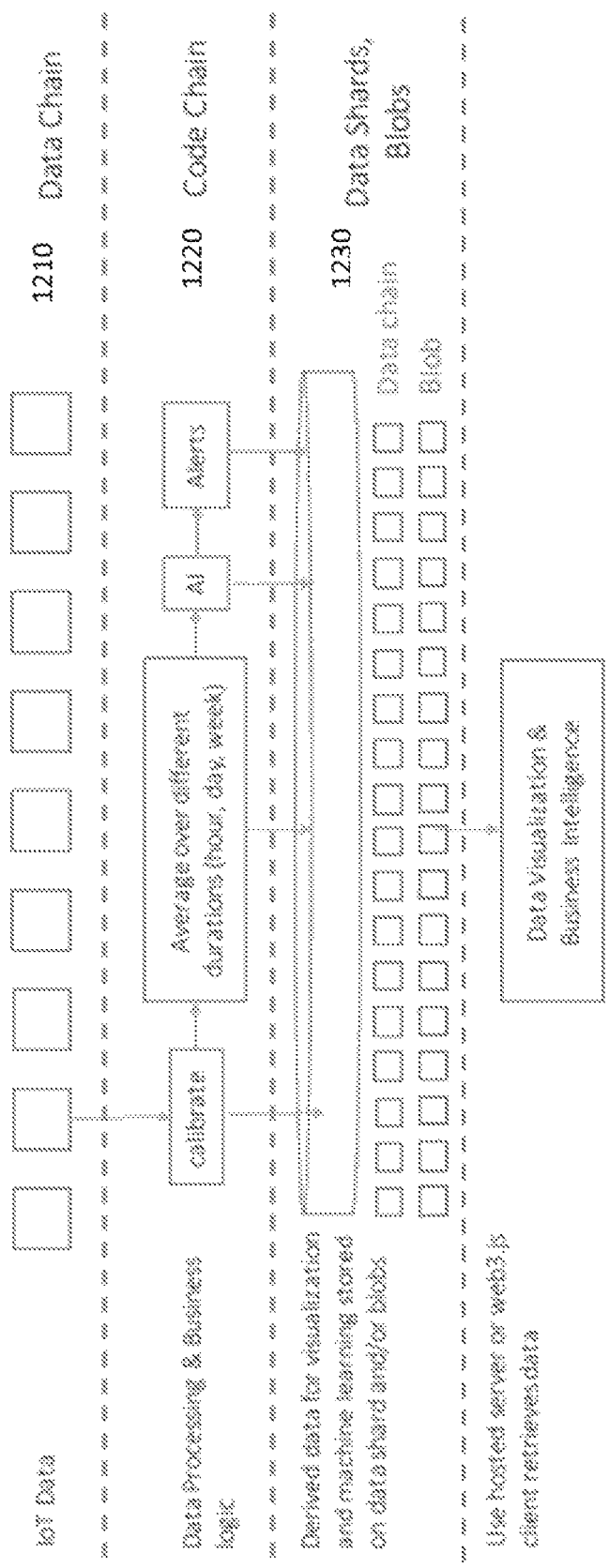
FIG. 12 is a view of an IoT architecture on the blockchain.

FIG. 12 shows an IoT platform architecture that can be implemented on the network. The data from an IoT device is sent to the data chain 1210. The application then sends a transaction to call an appropriate smart contract on the code chain 1220 that acts on the data received from the IoT device, and generate new data sets such as calibrated data, averaged data over a period, AI related data, and alerts. The data is placed either on the data chain, its shard or blob 1230 depending on the size of the dataset. With all the data on the blockchain, any client application can visualize the data by using a client browser or a hosted server that copies the data from the blockchain.

Figure 13:
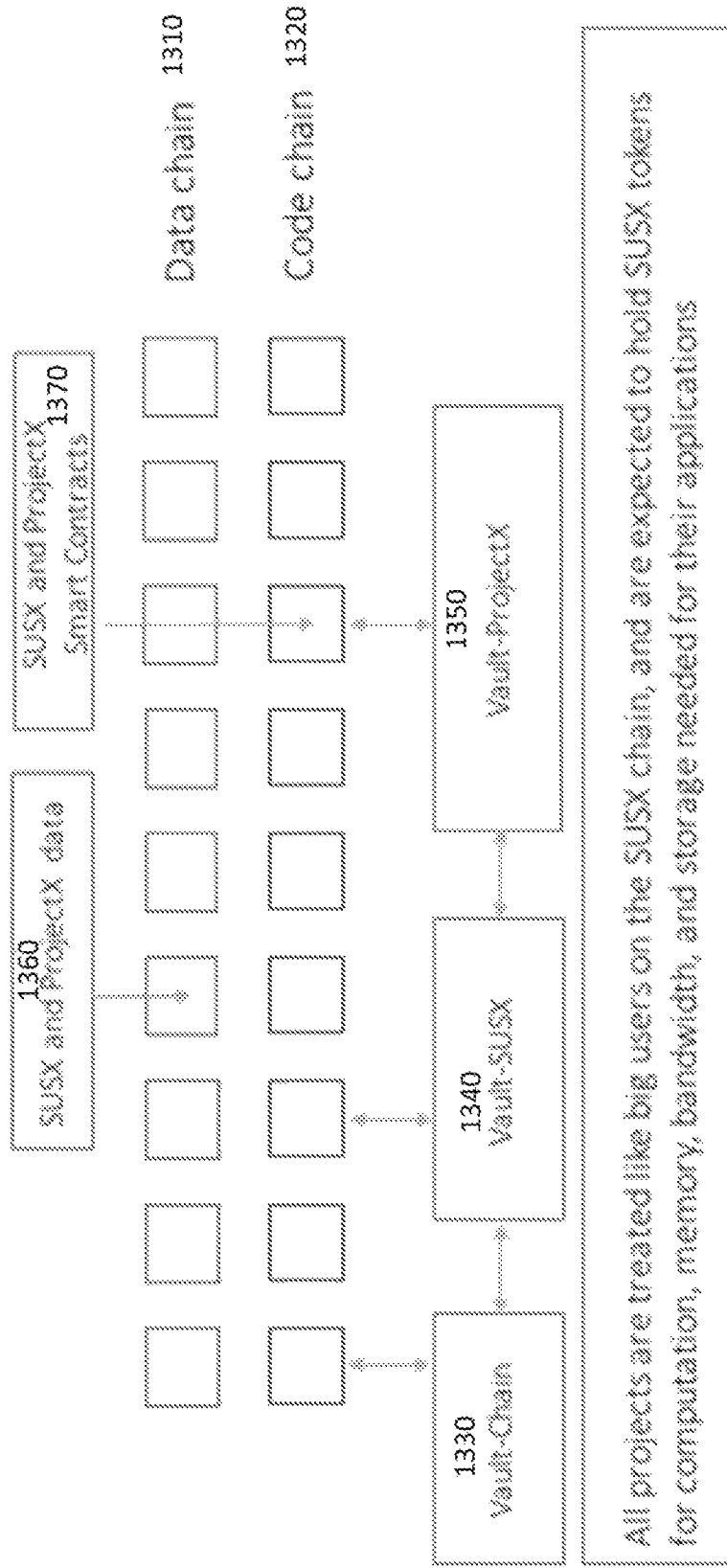
FIG. 13 is a view of multiple applications on the blockchain.

FIG. 13 shows how additional applications, i.e. Vault-Chain 1330, Vault-SUSX 1340 and Vault-ProjectX 1350, can be on top of the network and use existing chains, i.e. data chain 1310 and code chain 1320, to record data 1360 and smart contracts 1370. All applications are treated like big users on the network, and are expected to reserve some tokens for compute, memory, bandwidth, blob, code and content access needed by their application, and pay fees to the Vault as they exceed their threshold.

Figure 14:
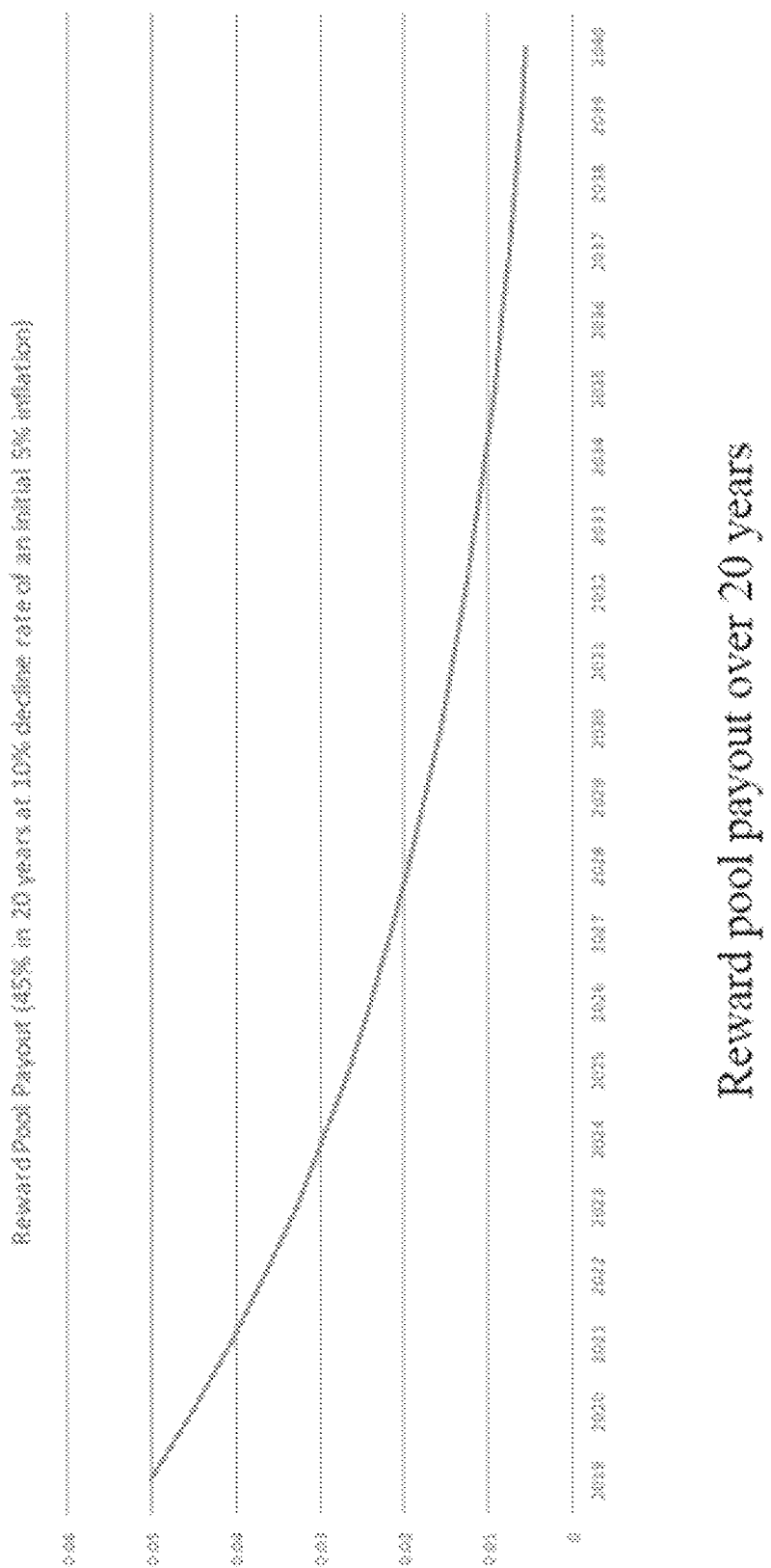
FIG. 14 shows the reward pool over time.

FIG. 14 shows how the reward pool will be reduced over time, as stakeholders regulate the number of tokens given out over a period, and the fees paid when users and applications go beyond the threshold. As the number of applications increase, the reward pool will be used more often for the miners, sharders, blobbers, developers, and publishers. This may increase the inflation rate of the rewards. The stakeholders set the reward size based on the median ask rate of the incentivized entities, and this rate may change daily as the value of the token changes, for the mutual benefit of the network and the miners. The reward pool may last 50 or 100 years or more, depending on how the stakeholders control inflation, which is a function of the number of rewards and the value of the network token. If there is a big demand in the network token (e.g. 2×), then there will be more rewards (2×) given out, but the value of token may have increased in value because of higher demand for the asking price to drop (0.5×). And so, the inflation rate will remain about the same as it started out in the beginning based on market forces. Now, let's consider the fact that the growth in the number of users and applications have reached saturation, but there is higher frequency of usage such that more users and applications are going beyond the threshold limit of using free resources. Then the users and applications contribute to the reward pool indirectly by increasing the fees received by the Vault, which will be eventually used after the reward pool is exhausted. Compared to Ethereum and Bitcoin, the inflation would be much lower at less than 5% initially, and then decreasing gradually as shown in FIG. 14. Since the total number of tokens is capped, the reward pool will eventually run out. And then based on the amount of Vault reserves collected from fees over the years, the stakeholders will determine the threshold, reward rate, and fee rate.

In addition to changing the reward value, reserve amount over n cycles, the network can stabilize inflation and token value if there is an inherent application that generates revenue. This revenue can be used to stabilize the token value by buying and selling the token against other stable fiat currencies.

FIG. 15 shows potential attacks that can hamper the network. A Sybil attack happens when a malicious node, i.e. blobber or sharder 1510 pretends to be a miner and sends fake blocks to a client. This is hard to do in our network, because there are only a few miners on the M×N set at any given time. Even if the attacker is successful and pretends to be one of the miners, the client can easily verify if the miner's signature and Block Hashes are consistent with other nodes. Once a honest node is determined, then the client latches on to it unless that node is replaced by another from the bench, in which the network will automatically handle the transition.

DoS (Denial of Service) attacks by the user can be easily traced and the user tokens can be frozen. The user needs to have ample tokens to perform this attack, and assuming it exceeds the Threshold, then he would need to pay fees to the Vault-Chain. So, there are mitigation steps that the network can take to prevent the user from flooding the network.

A double spend attack can happen if a miner colludes with ⅔+ miners, which is difficult, and self-defeating because of all the stake the ⅔+ miners need to lock up for n cycles, not to mention of their accounts frozen and transaction reversed or forked at the end.

A Nothing at Stake attack happens when a miner does not have any stake and mines a block to all available forks to increase their chances of getting rewards. Such economic incentive is not applicable for our network. This was a problem for naïve proof-of-stake algorithms, but since all miners need to reserve stakes for n cycles, this is not an applicable attack scenario, unless miners want to forfeit their reserves and need to collude with at least ⅔ for M×N miners.

A Long-Range attack happens when a miner secretly creates blocks from genesis and then reveals itself for other nodes to accept its version of truth. This attack is not applicable because there is a designated slot for every assigned miner to create a block, and the hash of the block is signed by the miner. Every block is signed by the assigned miner which is shuffled in the M×N set. Additionally, all shards will have a hash of the entire shard as it fills up and would be difficult to duplicate with a bad block. For example, Shard 0 will not change and have a Shard Hash that can be verified against other shards. For a current shard, the Shard Hash changes as new blocks are added, but this is difficult to duplicated with a bad block created some time ago.

During the initial Distribution or at a new Fork, or in the case of a bribe, the miners could generate bad blocks, but since they have locked stakes, the opportunity cost for such activity is high. Additionally, it will be stipulated to have 50% of the Old Miners on the new chain to preserve integrity of the chain. The reputation and collective stakes of the Old Miners will be at stake for a significant period of time until the fork is considered steady and the Old Miners can decouple their stakes based on the chain they are on.

Censorship or withholding data are avoided by having one or more secondary miners. If the primary miner withholds data or appears to do so, the secondary miners block is accepted, as long as all the miner's computing platforms are similar.

Selfish mining is traditionally meant only for proof-of-work systems where the miner secretly mines blocks and reveals them later to win the longest chain and hence win all the miner tokens away from other block creators. For this network, selfish mining can occur if it selects itself repeatedly in the M×N set, which it cannot do unless it colludes with others on the network.

Blobbers can have several attack scenarios identified by Filecoin. The Sybil attack, where the blobber pretends to store, will be prevented with the replacement algorithm, where a blob is periodically replaced with another one from the bench. Blobbers pretending to commit more or claiming to store more can be avoided by having the miners commit to random calls during the retrieval process. And generation attacks can be designed to be lossy.

User, i.e. code client 1530 attacks based on creating code that causes infinite loops, calls, reads, or writes are inherently prevented with a finite wall time for a transaction. If the user attacks goes beyond a Threshold, then the user starts paying fees for their transactions to the network, which would be self-defeating if they intend to continue the attacks. Additionally, the attacks could trigger an account from being frozen for some time until the activity is under control.

User, i.e. data client 1520, attacks include a large data upload attacks can be conducted by a malicious client. Since the upload needs to finish within the transaction wall time, the upload transaction would be terminated, and beyond a Threshold, the user needs to pay fees to the network.

In broad embodiment, the invention is systems and methods of a self-forking blockchain platform including forking from an existing blockchain for efficiency of the parent chain and subsequent forked chains.

Figure 16:
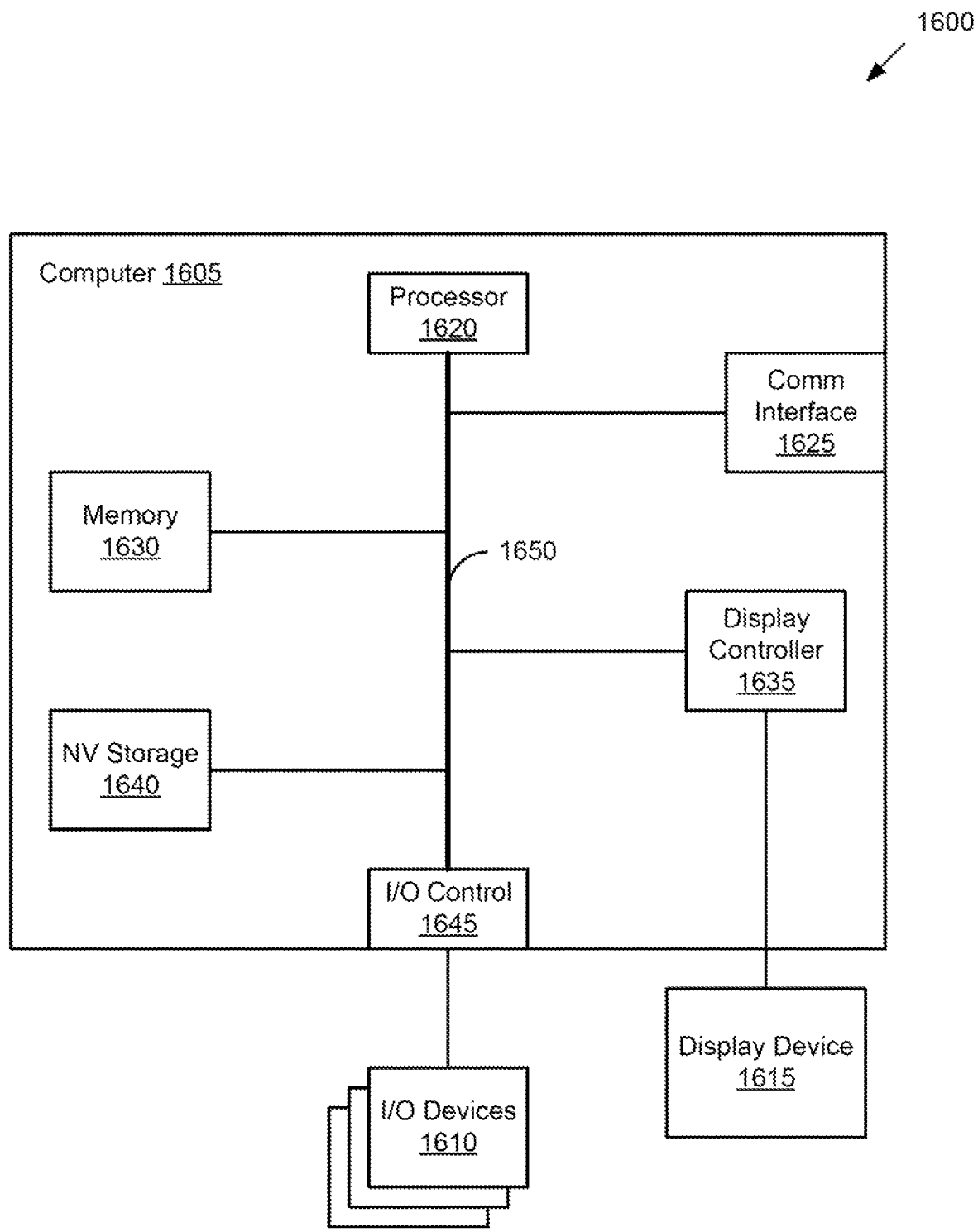
FIG. 16 is a schematic diagram of exemplary computing devices that can be used to implement the methods and systems disclosed herein, according to one embodiment.

FIG. 16 is a schematic diagram of computing device 1600 that can be used to implement the methods and systems disclosed herein, according to one or more embodiments. FIG. 16 is a schematic of a computing device 1600 that can be used to perform and/or implement any of the embodiments disclosed herein. In one or more embodiments, client system, a miner system, shard system and/or blobber system may be the computing device 1600.

The computing device 1600 may represent various forms of digital computers, such as laptops, desktops, workstations, personal digital assistants, servers, blade servers, mainframes, and/or other appropriate computers. The computing device 1600 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

Different embodiments described herein include components or structures to perform the described functionality. A "component" or a "module" as used in this disclosure, includes a dedicated or shared processor and, typically, firmware or software modules executed by the processor.

Depending upon implementation-specific or other considerations, a component or a module can be centralized or its functionality distributed. A component can include special purpose hardware, firmware, or software embodied in a computer-readable medium for execution by the processor.

FIG. 16 shows an example of a computing device 1600 on which techniques described here can be implemented. The computing device 1600 can be a conventional computer system that can be used as a client computer system, such as a wireless client or a workstation, or a server computer system. The computing device 1600 includes a computer 1605, I/O devices 1610, and a display device 1616. The computer 1605 includes a processor 1620, a communications interface 1625, memory 1630, display controller 1635, non-volatile storage 1640, and I/O controller 1645. The computer 1605 may be coupled to or include the I/O devices 1610 and display device 1616.

The computer 1605 interfaces to external systems through the communications interface 1625, which may include a modem or network interface. It will be appreciated that the communications interface 1625 can be considered to be part of the computing device 1600 or a part of the computer 1605. The communications interface 1625 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 1620 may be, for example, a conventional microprocessor such as an Intel Pentium microprocessor or Motorola power PC microprocessor. The memory 1630 is coupled to the processor 1620 by a bus 1650. The memory 1630 can be Dynamic Random Access Memory (DRAM) and can also include Static RAM (SRAM). The bus 1650 couples the processor 1620 to the memory 1630, also to the non-volatile storage 1640, to the display controller 1635, and to the I/O controller 1645.

The I/O devices 1610 can include a keyboard, disk drives, printers, a scanner, and other input and output devices, including a mouse or other pointing device. The display controller 1635 may control in the conventional manner a display on the display device 1616, which can be, for example, a cathode ray tube (CRT) or liquid crystal display (LCD). The display controller 1635 and the I/O controller 1645 can be implemented with conventional well-known technology.

The non-volatile storage 1640 is often a magnetic hard disk, an optical disk, or another form of storage for large amounts of data. Some of this data is often written, by a direct memory access process, into memory 1630 during execution of software in the computer 1605. One of skill in the art will immediately recognize that the terms "machine-readable medium" or "computer-readable medium" includes any type of storage device that is accessible by the processor 1620 and also encompasses a carrier wave that encodes a data signal.

The computing device 1600 is one example of many possible computer systems that have different architectures. For example, personal computers based on an Intel microprocessor often have multiple buses, one of which can be an I/O bus for the peripherals and one that directly connects the processor 1620 and the memory 1630 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 1630 for execution by the processor 1620. A Web TV system, which is known in the art, is also considered to be a computer system, but it may lack some of the components shown in FIG. 16, such as certain input or output devices. A typical computer system will usually include at least a processor, memory, and a bus coupling the memory to the processor.

Though FIG. 16 shows an example of the computing device 1600, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 16.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Several components described here, including clients, servers, and engines, can be compatible with or implemented using a cloud-based computing system. As used here, a cloud-based computing system is a system that provides computing resources, software, and/or information to client systems by maintaining centralized services and resources that the client systems can access over a communications interface, such as a network. The cloud-based computing system can involve a subscription for services or use a utility pricing model. Users can access the protocols of the cloud-based computing system through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

Figure 17:
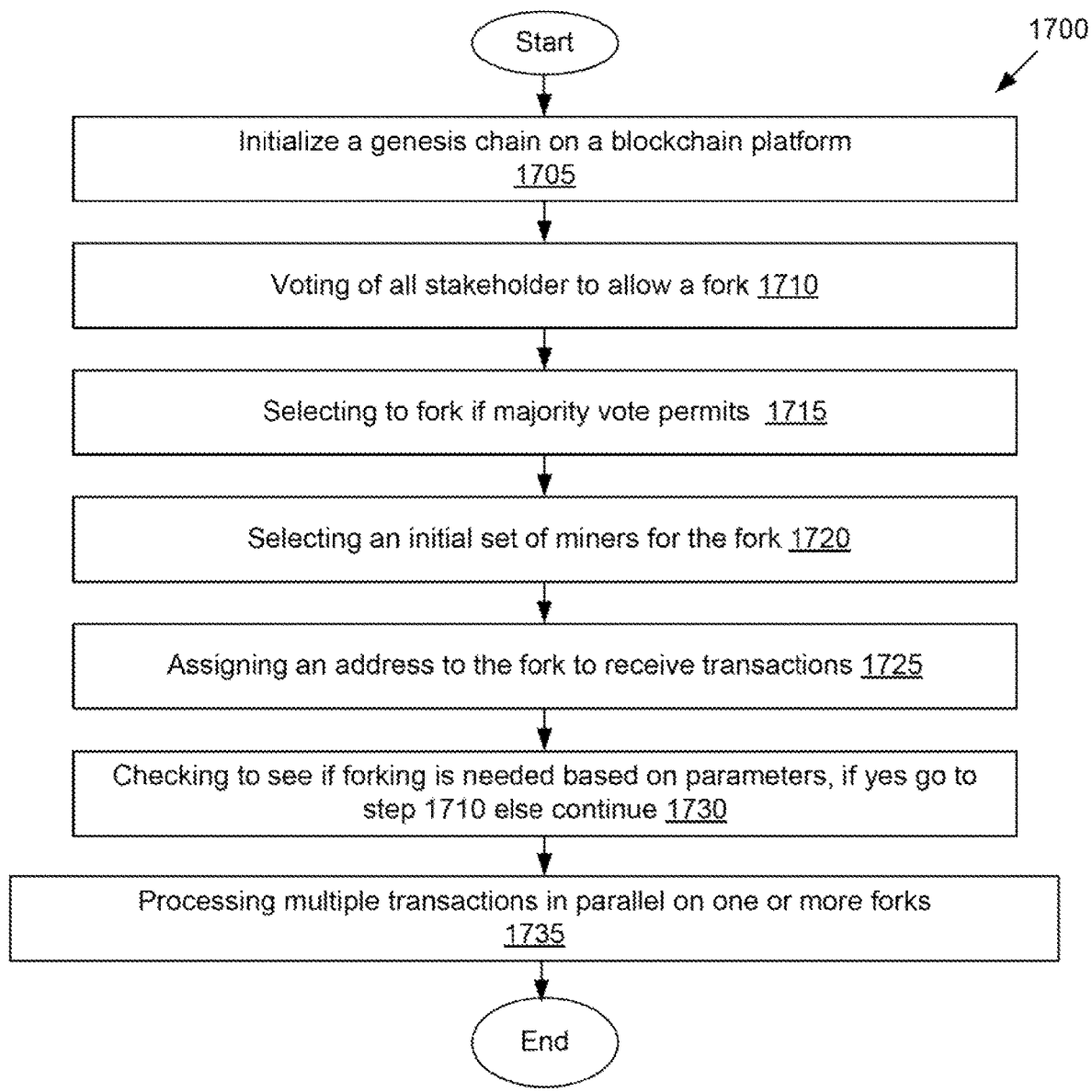
FIG. 17 shows a flowchart illustrating an example of a method of self-forking blockchain platform.

FIG. 17 shows the process for self-forking on the blockchain platform. At 1705, the blockchain platform is initialized with a genesis chain. At 1710, all the stakeholders vote as to whether to allow a fork on the blockchain. At 1715, the blockchain performs forking if the majority stakeholders vote for forking at step 1710. At 1720, the blockchain selects an initial set of miners for the new fork. At 1725, the new fork is assigned a chain address. By default and when no address is provided, the chain address is the genesis chain. At 1730, the blockchain checks to see if additional forking is needed based on different parameters as described in FIG. 11 and related description in this specification. If forking is needed, the flow goes to step 1710 and repeats. At 17345, if no forking is needed, the blockchain continues receiving and processing transactions including multiple transactions in parallel on one or more forks.

Figure 18:
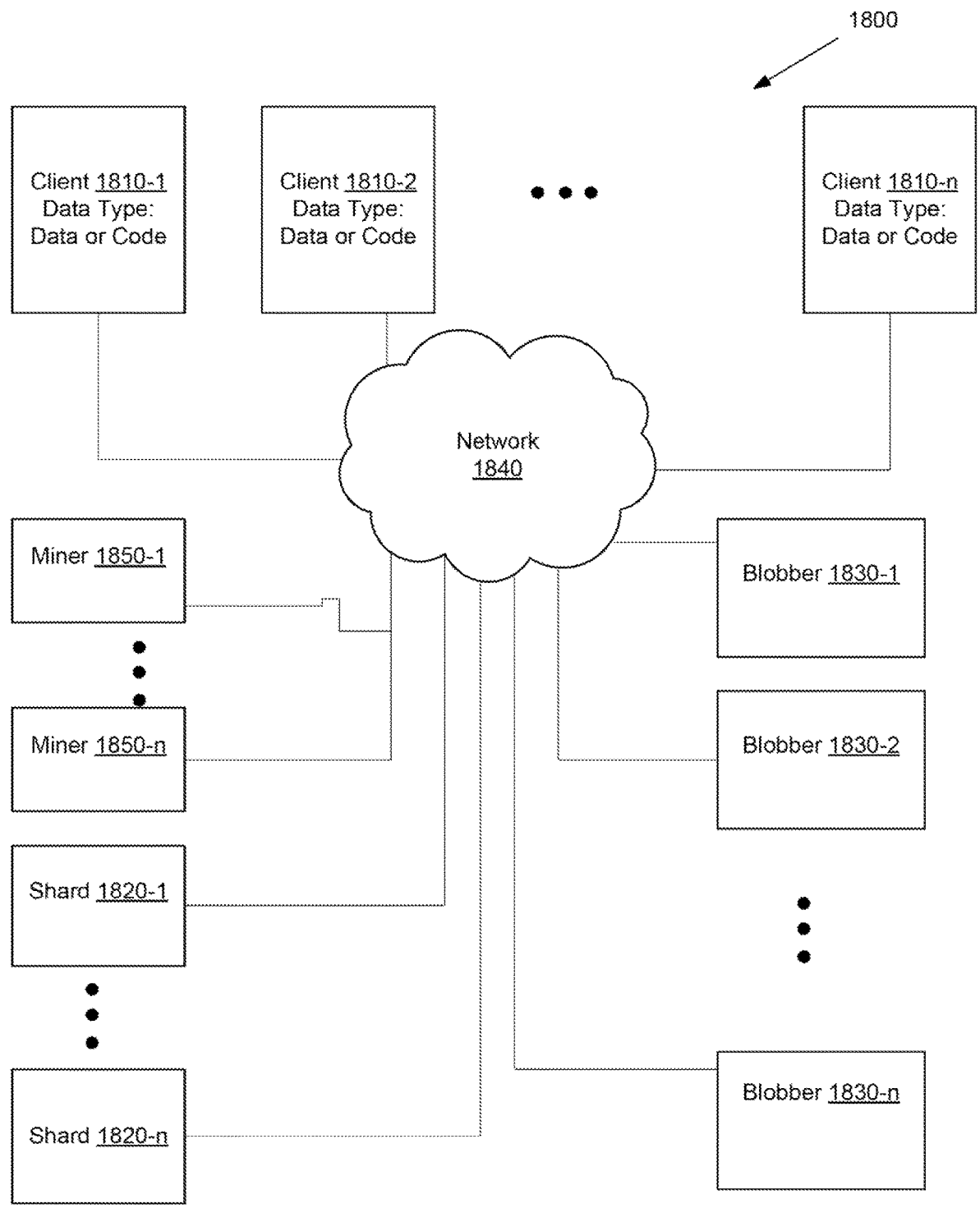
FIG. 18 shows an environment with different players on a blockchain platform.

In one embodiment, FIG. 18 depicts a diagram 1800 illustrating an example of a self-forking blockchain platform. In the example of FIG. 1, the environment includes a first client system 1810-1 through an nth client system 1810-n, network 1840, miner system 1850-1 through an nth miner system 1850-n, a shard system 1820-1 through 1820-n and blobber system 1830-1 through an nth blobber system 1830-n. In an implementation, the client system 1810 includes components to store, update, get, read, write and/or delete requests for both data types, i.e. data and code. In one implementation, the client system 1810 includes storage requests. A client can implement many types of flexible and distributed applications on the client system 1810 using the client aspect of the self-forking blockchain platform.

In one implementation, the miner 1850 includes components to process requests from the clients including storage requests. Two or more miners form a mining network. In one implementation, the blobber 1830 includes components to fulfill storage requests that are initiated by the client 1810 and approved by miner 1850. In one implementation the miner 1850 uses a shard 1820 for efficiency.

Network 1840 can be different wireless and wired networks available to connect different computer devices including client and server systems. In an implementation, network 1840 is publically accessible on the internet. In an implementation, network 1840 is inside a secure corporate wide area network. In an implementation, network 1840 allows connectivity of different systems and devices using a computer-readable medium.

The messaging and notification between different components can be implemented using application programming interface (API) calls, extensible markup language ("XML") interfaces between different interfaces, Java/C++ object oriented programming or simple web-based tools. Different components may also implement authentication and encryption to keep the data and the requests secure.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of self-forking on a blockchain platform, comprising: selecting an initial set of miners from a list of miners for a fork; assigning an address to the fork to receive transactions, and wherein if the address is not assigned, a default address which is a genesis chain address is assigned.

2. The method of claim 1, wherein the fork is for code chain, data chain, state chain or stateless chain.

3. The method of claim 1, further comprising:
voting of all stakeholders from a genesis chain to allow a fork; Selecting a fork based on a majority vote of the stakeholders.

4. The method of claim 1, further comprising:
using one or more sharders on the fork to speed up access, reduce memory or reduce storage.

5. The method of claim 1, further comprising:
using a blabber to store data from the transaction.

6. The method of claim 1, wherein the blockchain platform is not affected by attacks including one or more of the following: outsourcing, collusion, generation or sybil attacks.

7. The method of claim 1, wherein one of the received transactions retrieves or records information on more than one fork.

8. The method of claim 1, further comprising:
processing multiple transactions in parallel on one or more forks.

9. The method of claim 1, further comprising forking in response to one or more of the following parameters:
   storage allocation, finality, number of block producers, number of secondaries, number on bench, signatures, anonymity, verification, shard size, blob size, user or application reserve tokens, lock deposit, reward tokens.

10. A method of self-forking on a blockchain platform, comprising:
   co-existing of two or more chains on the blockchain platform after a fork;
   assigning a set of two or more miners to one or more chains;
   categorizing one or more assigned miners as primary, secondary or bench miner;
   tracking history of one or more chains independent of other chains;
   allowing a zero-cost fixed inflation model to reward the miners.

11. The method of claim 10, further comprising:
   assigning a set of one or more sharders to one or more chains to speed up access, reduce memory and reduce storage;
   categorizing one or more assigned sharders as primary, secondary or bench sharder.

12. The method of claim 11, further comprising:
   assigning a set of one or more blabbers to one or more chains to store data;
   categorizing one or more blabbers as primary, secondary or bench blabber.

13. The method of claim 12, further comprising:
   avoiding overloading a miner, sharder or blabber by separating one or more assignments;
   scaling the chains by separating the assignment of miners, sharders or blabbers.

14. A system of self-forking in a blockchain platform, comprising:
   a module to select an initial set of miners from a list of miners for the fork;
   a module to assign an address to the fork to receive transactions, and wherein if the address is not assigned, a default address which is a genesis chain address is assigned.

15. The system of claim 14, wherein the fork is for code chain, data chain, state chain or stateless chain.

16. The system of claim 14, further comprising:
   a module to receive votes of all stakeholders from a genesis chain to allow a fork;
   a module to select to fork based on a majority vote of the stakeholders.

17. The system of claim 14, further comprising:
   a module to use one or more sharders on the fork to speed up access, reduce memory or reduce storage.

18. The system of claim 14, further comprising:
   a module to use a blobber to store data from the transactions.

19. The system of claim 14, wherein the blockchain platform is not affected by attacks including one or more of the following: outsourcing, collusion, generation or sybil attacks.

20. The system of claim 14, wherein one of the received transactions retrieves or records information on more than one fork.

21. The system of claim 14, further comprising:
   processing multiple transactions in parallel on one or more forks.

22. The system of claim 14, further comprising forking in response to one or more of the following parameters:
   data type, block time, data size, transaction time, compute, bandwidth, memory, storage allocation, finality, number of block producers, number of secondaries, number on bench, signatures, anonymity, verification, shard size, blob size, user or application reserve tokens, lock deposit, reward tokens.

23. A system of selfforking on a blockchain platform, comprising:
   A module to co-exist two or more chains on the blockchain platform after a fork;
   a module to assign a set of two or more miners to one or more chains;
   a module to categorize one or more assigned miners as primary, secondary or bench miner;
   a module to track history of one or more chains independent of other chains;
   a module to allow zero-cost fixed inflation model to reward the miners.

24. The system of claim 23, further comprising:
   a module to assign a set of one or more sharders to one or more chains to speed up access, reduce memory and reduce storage;
   a module to categorize one or more assigned sharders as primary, secondary or bench sharder.

25. The system of claim 24, further comprising:
   a module to assign a set of one or more blabbers to one or more chains to store data;
   a module to categorize one or more blabbers as primary, secondary or bench blabber.

26. The system of claim 25, further comprising:
   a module to avoid overloading a miner, sharder or blabber by separating one or more assignments;
   a module to scale the chains by separating the assignment of miners, sharders or blabbers.

* * * * *